United States Patent
Addala et al.

(10) Patent No.: US 9,729,631 B2
(45) Date of Patent: Aug. 8, 2017

(54) ASYNCHRONOUS DATA MANIPULATION

(71) Applicant: Apple Inc., Cupertino, CA (US)

(72) Inventors: Viswanadh Addala, Campbell, CA (US); Melody Hsinli Hsu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 14/336,961

(22) Filed: Jul. 21, 2014

(65) Prior Publication Data

US 2014/0330896 A1 Nov. 6, 2014

Related U.S. Application Data

(63) Continuation-in-part of application No. 13/250,537, filed on Sep. 30, 2011, now Pat. No. 8,788,627.

(51) Int. Cl.
*H04L 29/08* (2006.01)
*H04L 29/06* (2006.01)
*G06F 17/30* (2006.01)

(52) U.S. Cl.
CPC ...... *H04L 67/1095* (2013.01); *G06F 17/3089* (2013.01); *H04L 67/02* (2013.01); *H04L 67/42* (2013.01)

(58) Field of Classification Search
CPC ..... H04L 67/02; H04L 67/1095; H04L 67/42; G06F 17/3089
See application file for complete search history.

(56) References Cited

U.S. PATENT DOCUMENTS

| | | | |
|---|---|---|---|
| 6,598,077 B2 | 7/2003 | Primak et al. | |
| 6,901,425 B1 | 5/2005 | Dykes et al. | |
| 7,346,649 B1 | 3/2008 | Wong | |
| 7,516,167 B2 * | 4/2009 | Selman | G06F 17/30581 |
| 7,631,045 B2 * | 12/2009 | Boerries | H04L 67/327 |
| | | | 707/999.1 |
| 7,698,276 B2 | 4/2010 | Seshadri et al. | |
| 7,788,679 B2 | 8/2010 | Chen et al. | |
| 7,873,912 B1 | 1/2011 | Crim et al. | |
| 7,899,907 B2 * | 3/2011 | Tse | H04L 67/2823 |
| | | | 370/229 |
| 7,962,551 B2 | 6/2011 | Mukundan et al. | |
| 8,126,963 B1 | 2/2012 | Rimmer | |
| 8,146,097 B2 | 3/2012 | Mukundan et al. | |
| 9,367,832 B2 * | 6/2016 | Martin | G06Q 10/10 |
| 2003/0023463 A1 | 1/2003 | Dombroski et al. | |
| 2003/0206192 A1 | 11/2003 | Chen et al. | |
| 2004/0205065 A1 | 10/2004 | Petras et al. | |

(Continued)

*Primary Examiner* — Michael C Lai
(74) *Attorney, Agent, or Firm* — Downey Brand LLP

(57) ABSTRACT

Methods, program products, and systems of synchronizing data while the data is being edited by a user are disclosed. A web application system implementing a notification-based web application framework can allow a user to focus or edit data in a browser on a client device while the data displayed in the browser is being synchronized with data stored on a database server. The user edit and the synchronization can be asynchronous with one another, where editing can occur before a response from the database server is received. Accordingly, user perceived response time is improved over a conventional system where a user must wait for the response from the server before the user can proceed to edit the data.

24 Claims, 26 Drawing Sheets

(56) References Cited

U.S. PATENT DOCUMENTS

| | | |
|---|---|---|
| 2005/0108418 A1 | 5/2005 | Bedi et al. |
| 2007/0204273 A1 | 8/2007 | Chen et al. |
| 2007/0226613 A1 | 9/2007 | Tandriono et al. |
| 2009/0104957 A1 | 4/2009 | Lydon et al. |
| 2010/0131420 A1 | 5/2010 | Williams et al. |
| 2010/0153853 A1 | 6/2010 | Dawes et al. |
| 2010/0185498 A1 | 7/2010 | Bechtel |
| 2011/0191676 A1 | 8/2011 | Guttman et al. |
| 2012/0331109 A1 | 12/2012 | Baum et al. |
| 2013/0086146 A1 | 4/2013 | Addala et al. |

* cited by examiner

ASYNCHRONOUS DATA MANIPULATION

CROSS-REFERENCE TO RELATED APPLICATION

This application is a continuation-in-part of and claims priority to U.S. application Ser. No. 13/250,537, entitled "Interactive Web Application Framework," filed on Sep. 30, 2011, issued as U.S. Pat. No. 8,788,627, on Jul. 22, 2014, the entire contents of which are incorporated herein by reference.

TECHNICAL FIELD

This disclosure relates generally to database-backed web applications.

BACKGROUND

A web application can include an application program executing at a web site on a server, and accessible remotely from a user device through a communications network. The web site often includes a web server, an application server, and a database server. The web server can be configured to receive requests from a user device. The application server can be configured to perform logic operations of the web application. The database server can provide data for the web application.

The web application can be accessed through a software program ("web browser" or simply "browser") executing on the user device. The browser can be a client program configured to make a request to the web site, wait for a response from the web site, and render the response upon receiving the response.

SUMMARY

Methods, program products, and systems of synchronizing data while the data is being edited by a user are disclosed. A web application system implementing a notification-based web application framework can allow a user to focus or edit data in a browser on a client device while the data displayed in the browser is being synchronized with data stored on a database server. The user edit and the synchronization can be asynchronous with one another, where editing can occur before a response from the database server is received. Accordingly, user perceived response time is improved over a conventional system where a user must wait for the response from the server before the user can proceed to edit the data.

Methods, program products, and systems of a notification-based web application framework are disclosed. A web application system implementing a notification-based web application framework can allow a user to manipulate not only data, but also logic and user interface for a web application. The system can create or modify the web application based on user input received through a browser, and publish the created or modified web application to other browsers. By applying asynchronous communication techniques, the system can push updates of data, user interface, and logic of the web application made in a first browser to a second browser without receiving a specific request for the updates from the second browser.

The disclosed techniques include an architecture that can bring behaviors typical of a desktop application to the web. The architecture can expose dynamic content stored in a database to a browser. The dynamic content stored in the database can include custom look and feel and application logic, which are conventionally built into an application server. The architecture utilizes multiple web application systems working in concert to facilitate communication between a web server and a database server. The multiple web application systems can be configured to allow asynchronous and two-way communication such that, for example, a server can initiate communication to a client and make requests to the client. The roles of "client" and "server" can be interchangeable.

In some implementations, a first web application system can receive database data from a database server. The first web application system can be optimized to communicate with the database server. The first web application system can process the received database data to generate publication data. A second web publication system can receive the publication data from the first web application system. The second web application system can be optimized to communicate with a web server. The second web application system can process the publication data to generate web data. The second web application system can send the generated web data to a web server for pushing to a web browser.

In some implementations, a web application system can receive a database notification from a database server. The database notification can indicate that an update of a user interface item has occurred in a database. The database notification can be generated from the database server in response to a request from a user device. The user device can include a browser. The request can be a request to receive information when a state change occurs at the database server. The web application system can initiate communication with the user device without responding to a specific request requesting the update from the user device. The web application system can generate instructions for refreshing the user interface item in the browser. The web application system can push the instructions to the user device for refreshing the user interface item as displayed in the browser according to the update in the database.

In some implementations, a first web application system can receive a message originated from a browser through a second web application system. The message can include data and metadata. The metadata can indicate that the second web application system received the data from the browser of a user system using a first connection between the second web application system and the browser. The first web application system can send the data to a database server as a request, and receiving a response from the database server. The first web application system, upon receiving the response, can cause the second web application system to create a second connection between the second web application system and the browser based on the metadata. The first web application system can send the response to the browser through the second connection asynchronously with the message.

The techniques described in this specification can be implemented to achieve the following exemplary advantages. A user interface item or logic operations of a web application can be edited in a browser environment. Thus, the browser can act as an interface of an integrated development environment (IDE). A user can use a browser as an integrated environment for data browsing, database design, as well as user interface design and business logic development. For example, a web application user browsing database data with a browser can change, on the fly, the way in which the data are laid out, the behavior of a user interface item (e.g., a button displayed in the browser), or the work flow of the web application. In addition, the techniques described can enable a collaborative work environment, where multiple people can work on a same layout, database schema, user interface system, and business logic.

The details of one or more implementations of the notification-based web application framework are set forth in the accompanying drawings and the description below. Other features, aspects, and advantages of the notification-based web application framework will become apparent from the description, the drawings, and the claims.

BRIEF DESCRIPTION OF THE DRAWINGS

Like reference symbols in the various drawings indicate like elements.

DETAILED DESCRIPTION

Architecture

Figure 1:
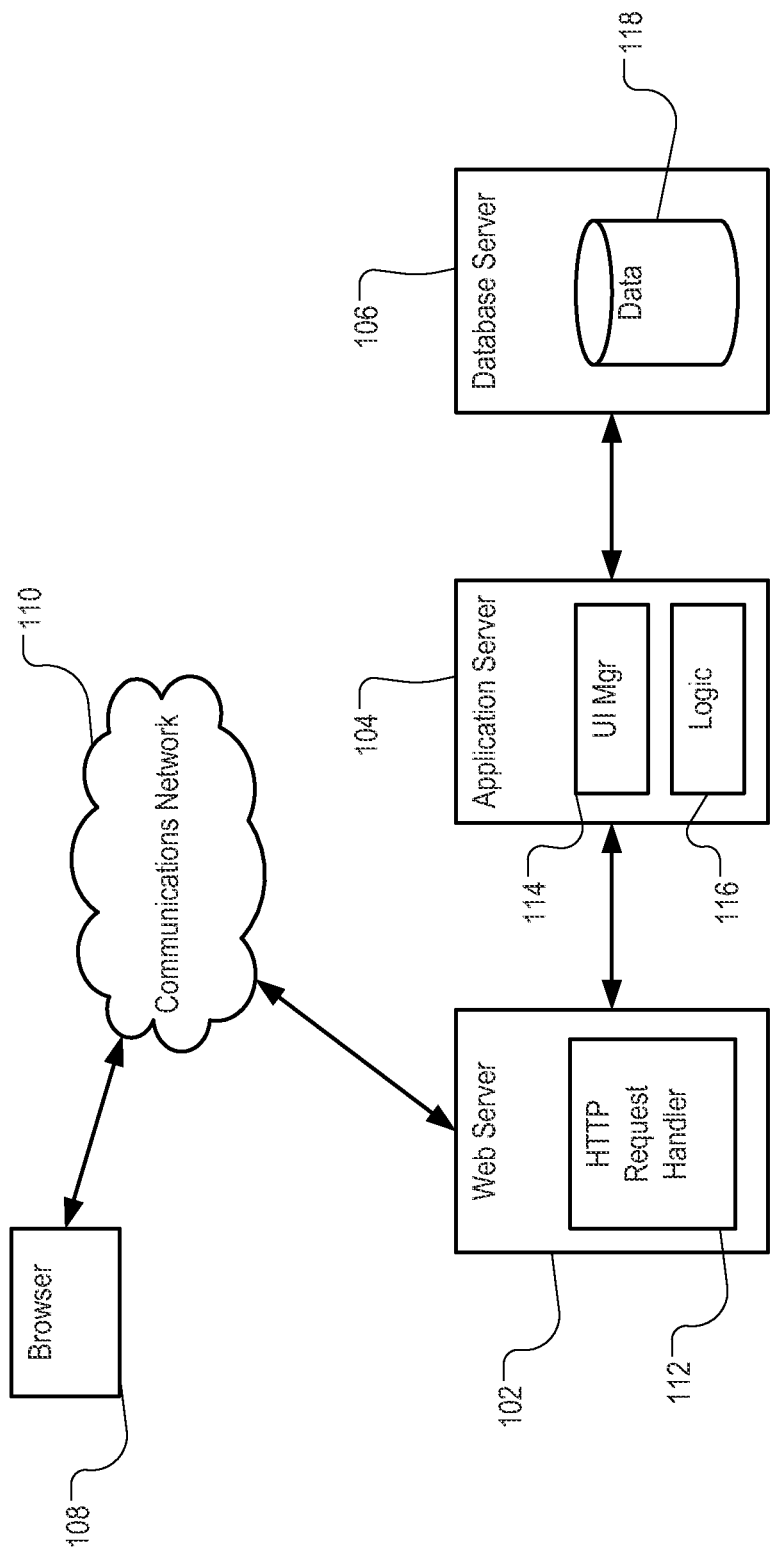
FIG. 1 is a block diagram illustrating a conventional system for implementing a database backed web application.

FIG. 1 is a block diagram illustrating a conventional system for implementing a database backed web application. The system can include web server 102, application server 104, and database server 106. Web server 102, application server 104, and database server 106 are computers programmed to provide service to a user of browser 108 through communications network 110.

Web server 102 can include one or more computers programmed to perform operations of processing requests from browser 108 and delivering content to browser 108. Web server 102 can include a hypertext transfer protocol (HTTP) request handler 112 configured to receive a request from browser 108. HTTP request handler 112 can process the received request and identify one or more web application inputs from the received request. Web server 102 can provide the web application inputs to application server 104.

Application server 104 can include one or more computers programmed to generate user interface and conduct application logic operations of the web application. Application server 104 can include user interface manager 114 and logic component 116. User interface manager 114 can be a component of application server 104 configured to generate, configure, and manage user interface items (e.g., buttons, text boxes, or widgets) for display in browser 108. Logic component 116 can be a software component of application server 104 configured to apply application logic to link the user interface items with data and define and manage workflow of the web application. For example, when user interface manager 114 of application server 104 receives an input indicating that a user clicked on a widget in browser 108, user interface manager 114 can send the information to logic component 116. Logic component 116 of application server 104 can cause certain data to be retrieved or updated and sent to browser 108.

Database server 106 can include one or more computers programmed to perform operations of managing database 118. Database 118 can store data locally or remotely from database server 106, and manage the data using a relational, object oriented, or flat file paradigm. Database server 106 can receive data retrieval requests from application server 104 and provide the data in response, or receive data update requests from application server 104 and update the data in response.

In a conventional system for a database backed web application, communication between each component is typically synchronous. For example, when browser 108 sends a request to web server 102 through a connection, the connection becomes blocked. Browser 108 can wait for a response from web server 102 until a response is received at browser 108 or until the connection is otherwise terminated (e.g., closed by user or timed out). During the time the connection is blocked, interactions specific to the request and the response can occur between web server 102, application server 104, and database server 106. The communication between web server 102, application server 104, and database server 106 can be similarly blocked.

In addition, in a conventional system for a database backed web application, the roles of "client" and "server" are typically clearly designated. For example, browser 108 can be a client of web server 102, which can be a client of application server 104, which, in turn, can be a client of database server 106. Likewise, database server 106 can be a server of application server 104, which can be a server of web server 102, which, in turn, can be a server of browser 108.

Figure 2A:
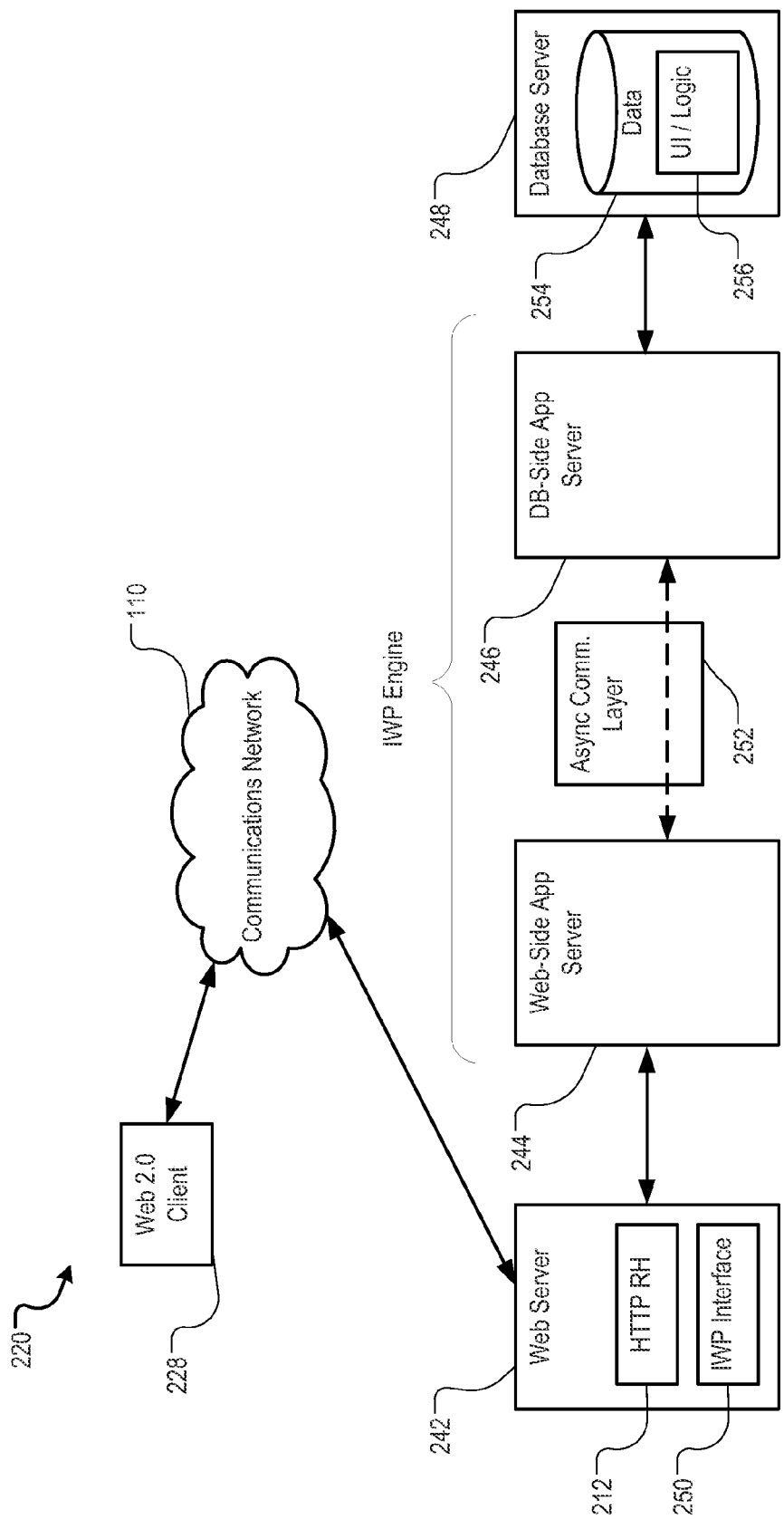
FIGS. 2A and 2B are block diagrams providing an overview of an exemplary notification-based web application framework.

FIG. 2A is a block diagram providing an overview of an exemplary notification-based web application framework 220. The framework can support web applications that are user-definable. A user-definable web application can include a web application whose data, user interface, and logic can be defined or manipulated by a user through a browser. An example of a user-definable web application is instant web publishing (IWP). IWP can include a mechanism that allows a user to share one or more databases, as well as one or more web applications, with other users via a web browser. The user can create an application through a browser, including specifying data, layout, and business logic of the application in the browser, and store the data, layout, and business logic in a database. The user can expose the application to other users. A user having sufficient privilege can change the data, layout, and business logic through a browser. The change can be propagated to other browsers using push technology.

An event notification (or simply "notification") can include a message sent from a sender to a receiver. The sender can send the message at any time, e.g., upon a state change at the sender. The message is operable to trigger an action at the receiver. A system implementing the notification-based web application framework can include web server 242, web-side application server 244, database-side application server 246, and database server 248. Web server 242, web-side application server 244, database-side application server 246, and database server 248 can be one or more computers programmed to provide services to an interaction-enabled client 228 through communications network 110. Client 228 can be a web 2.0 client. Client 228 can include, for example, a script (e.g., PHP script) or a browser having one or more plugin components for providing interactive and site-specific content. Communications network 110 can include a wired or wireless, wide area, local area, or personal area data network.

Web server 242 can include a software component executing on one or more computers and configured to cause the one or more computers to perform operations of delivering content to client 228. Web server 242 can include HTTP request handler 212 and IWP interface 250 configured to interface between web server 242 and web-side application server 244. IWP interface 250 can implement an IWP application programming interface (API). IWP interface 250 can be programmed to send one or more web application inputs identified from an HTTP request received by HTTP request handler 212 to web-side application server 244. The web application inputs can include requests to web-side application server 244.

Web-side application server 244 can include a software component executing on one or more computers and configured to cause the one or more computers to serve as a communication link between web server 242 and database-side application server 246. Web-side application server 244 can process the web application inputs from web server 242 as well as content from database-side application server 246. Web-side application server 244 can process web application inputs formatted according to XML Metadata Interchange (XMI) standards or other communication standards. Web-side application server 244 can handle communication including requests for data updates, requests for rendering custom user interface, and notifications from either web server 242 or database-side application server 246. The operations of processing notifications will be described in further details below in reference to FIG. 3. Web-side application server 244 can be a server based on C, C++, Java, or other programming languages.

Database-side application server 246 can be a software component executing on one or more computers and configured to cause the one or more computers to serve as an abstraction layer of database server 248. Database-side application server 246 can be a server based on C, C++, Java, or other programming languages. Database-side application server 246 can communicate with web-side application server 244 through asynchronous communication layer 252. Asynchronous communication layer 252 can include hardware and software configured to facilitate asynchronous communication between servers that are programmed in different languages, for example, between web-side application server 244 programmed in Java and database-side application server 246 programmed in C++.

Database server 248 can include one or more computers programmed to perform operations of managing database 254. Database 254 can store data locally or remotely from database server 248, and manage the data under a relational, object oriented, or flat file paradigm. Database 254 can store smart data 256. Smart data 256 can include conventional data items (e.g., numerical values, strings, or triggers) and active data items relating to user interface or logic.

Web-side application server 244, database-side application server 246, and asynchronous communication layer 252 can be designated as an IWP bridge. At least a portion of the IWP bridge, as well as at least a portion of web server 242 and client 228, can be implemented in a rich internet application (RIA) framework such as Vaadin™ or Wicket™

The IWP bridge is configured to facilitate asynchronous communication between client 228 and database server 248 using notifications. The IWP bridge can manage blocking or unblocking of communication between client 228 and database server 248. When client 228 sends a request for a response through a connection, each of web server 242, web-side application server 244, database-side application server 246, and database server 248 can communicate with each other using event notifications. In addition, web server 242 can send to client 228 an event notification as a response to the request.

The event notification can be sent through a new connection, which can be initiated by web server 242. The IWP bridge can use an event-based communication paradigm that is different from a conventional client-server communication system, where a response is typically sent from a server to a client on a same connection through which a request is received. In addition, using the event-based communication paradigm, the IWP bridge can permit either client 228 or database server 248 to initiate communication by sending a request. The roles of "server" and "client" can be reversed. A response to a request can come at a later point of time through the new connection instead of coming over the same connection where the request is initiated.

Figure 2B:
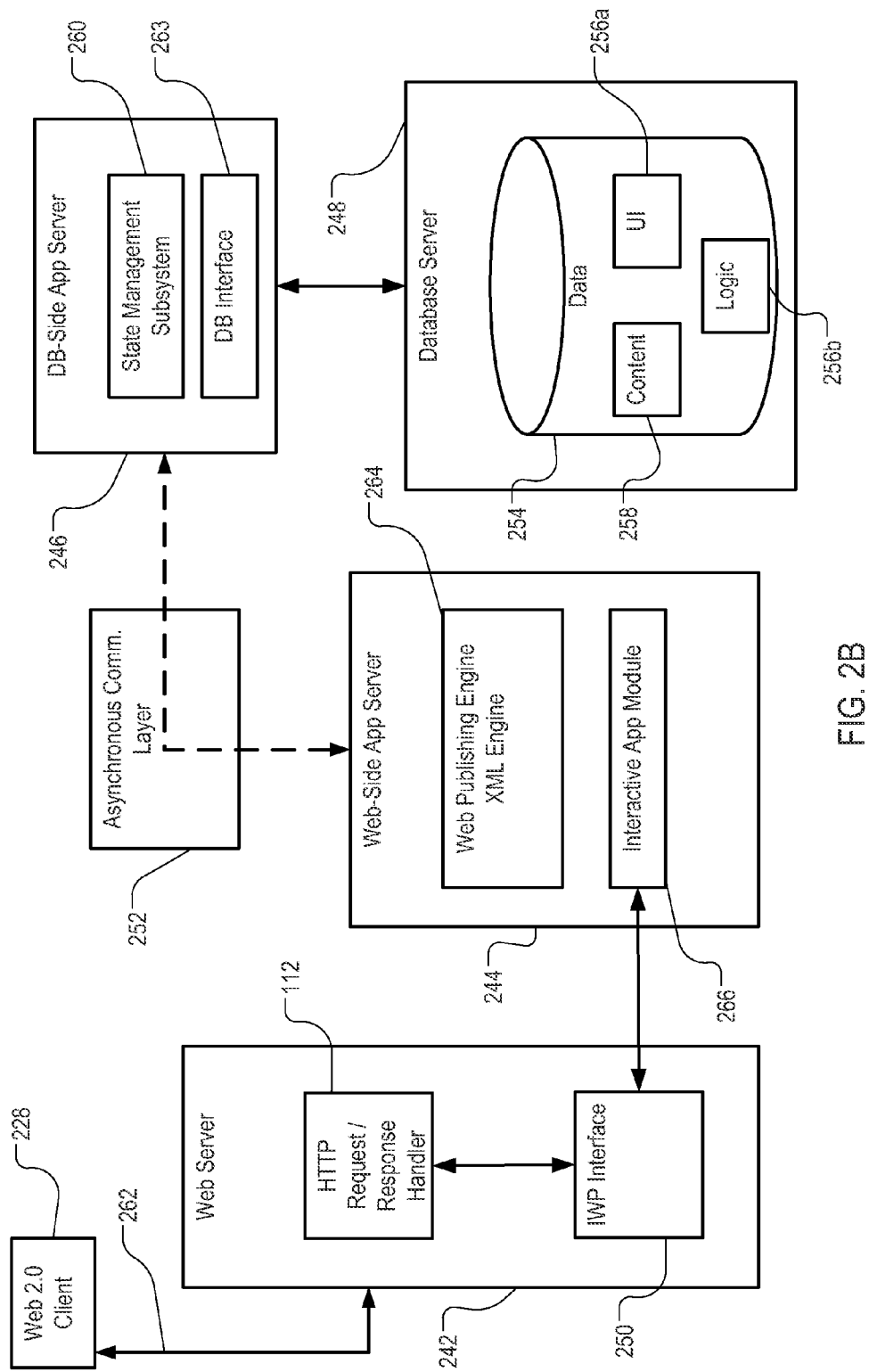

FIG. 2B is a block diagram illustrating further details of exemplary architecture of a notification-based web application framework as described in reference to FIG. 2A. Additional details on subsystems of each component of the notification-based web application framework, as well as on communications between various components, are described.

Database 254 can store user interface definition 256*a*, business logic 256*b*, and passive content 258. User interface definition 256*a* can include specifications (e.g., types, shapes, and locations) of one or more user interface items.

Business logic 256*b* can include scripts, data describing a relationship between user interface items and passive data, and data describing a relationship between user interface items and the scripts. Passive data can include text, numerical values, and multimedia data. The specifications of user interface definition 256*a* can be stored in XML, text, or binary format.

Database-side application server 246 can communicate with database server 248 using an event-based communication paradigm. The event-based communication paradigm can be a cross-platform and cross-language communication paradigm where information is exchanged between two entities using an event notification. The communication can be facilitated using a common object request broker architecture (CORBA).

Database-side application server 246 can include state management subsystem 260 and database interface 263. State management subsystem 260 can include a software component configured to cause a computer of the system to detect, track, and manage states of various components of the system. The operations of state management system 260 will be described in further detail below in reference to FIGS. 11A and 11B. Database interface 263 can include a software component configured to server as an additional API layer to a database specific API (if any) that wraps around the database specific API. Database interface 263 can facilitate communication between the IWP bridge and multiple types of databases or databases having different database specific APIs.

Asynchronous communication layer 252 can be configured to manage asynchronous communications between web-side application server 244 and database-side application server 246. Managing the asynchronous communications can include managing the flow of event notifications using dispatchers and queues. The asynchronous communications can facilitate event notification between web-side application server 244 and database-side application server 246. The asynchronous communications are represented using dashed arrows in FIG. 2B. The asynchronous communications can be implemented using XMI requests via Apache JSery protocol (AJP).

Web-side application server 244 can include web publishing engine 264 and interactive application module 266. Web publishing engine 264 can be a software component of web-side application server 244 configured to cause one or more computers to perform operations of processing event notifications to and from database-side application server 246. Interactive application module 266 can be a software component of web-side application server 244 configured to cause one or more computers to perform operations of communicating with IWP interface 250 of web server 242. Further details of interactions between components, including request processing based on notification, are described below in reference to FIG. 3.

Communication 262 between web server 242 and client 228 can include an HTTP or HTTPS request, an RIA call through HTTP or HTTPS, or and HTTP or HTTPS FMI/XML request. Communication 262 can be facilitated using JavaScript Object Notation (JSON) data interchange format.

Exemplary Notification-Based Request Processing

Figure 3:
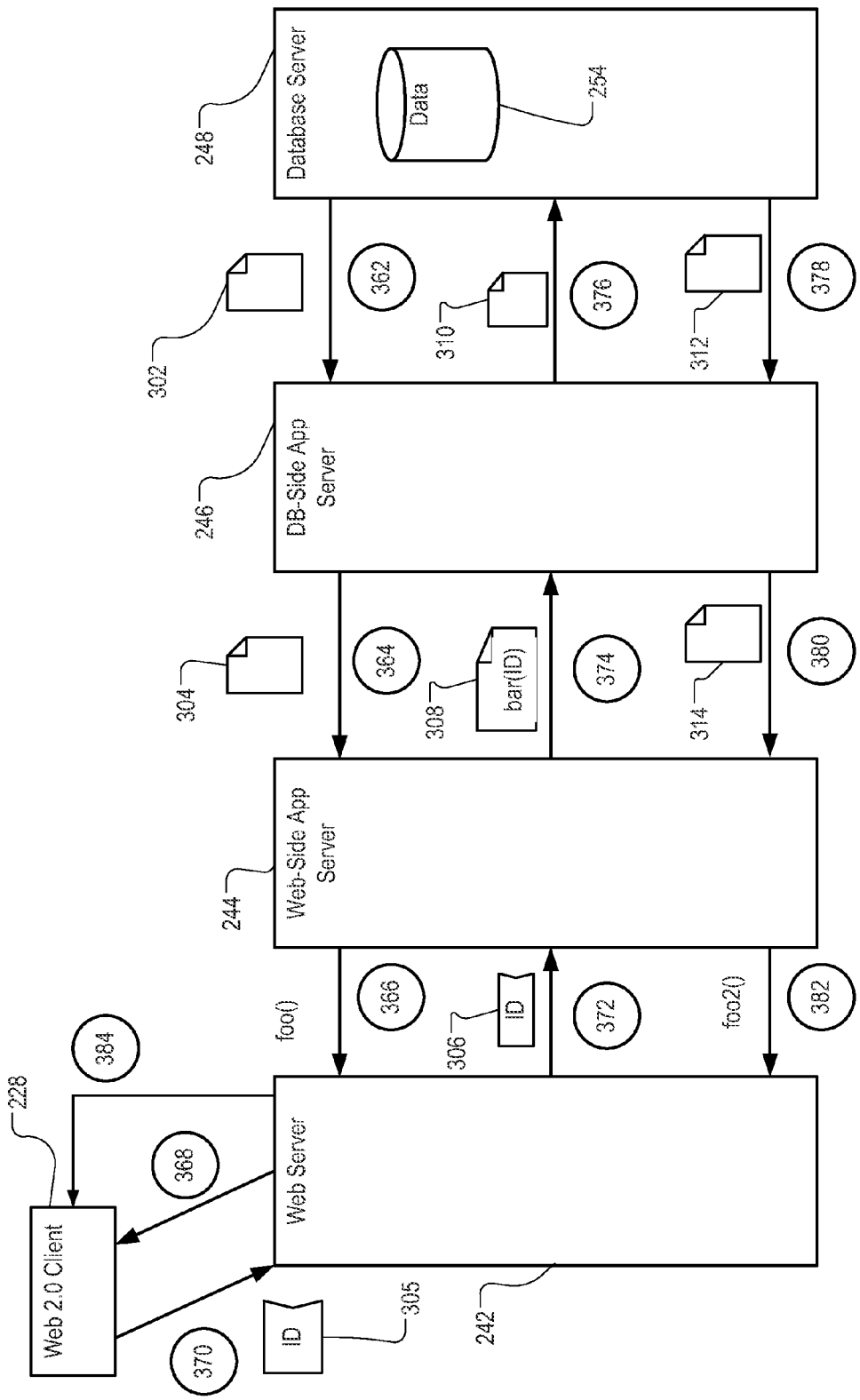
FIG. 3 is a diagram illustrating exemplary techniques of notification-based request processing.

FIG. 3 is a diagram illustrating exemplary techniques of notification-based request processing. For illustrative purpose, the techniques are described in reference to operations of drawing and configuring a user interface item (e.g., a button) on a display device of client 228. The operations can include drawing the user interface item on client 228 according to a definition in a database. The operations can include receiving a request generated by client 228 as a result of a user's interaction with the user interface item. The operations can include processing the request using a system configured to generate one or more notifications and communicate between various components of the system using the notifications. By using notifications at various stages of the communication, the system can cache, prioritize, and queue multiple requests and responses at each stage, allowing the communication to be performed asynchronously, and allowing the communication to propagate from client 228 to multiple client devices.

The system can draw the user interface item at client 228, e.g., in a browser. When the user connects to database 254 and opens database 254, database server 248 can identify a layout, e.g., "Layout A" that includes definitions of one or more user interface items and specifies a "look and feel" specific to a web application. The layout can be stored in the database. The system can generate user interface (UI) definition 302 according to the layout. UI definition 302 can include a type, size, shape, and function of a user interface item, and can be implemented in any format, including markup language (e.g., XML), YAML, JSON, or free-style text.

At stage 362, database-side application server 246 can receive UI definition 302 from database server 248. Database-side application server 246 can generate notification 304 based on UI definition 302. Notification 304 can include a UI definition document (e.g., an XML document) that can be recognized and processed by web-side application server 244.

At stage 364, web-side application server 244 can receive notification 304. Web-side application server 244 can parse the UI definition document in notification 304. Based on result of the parsing, at stage 366, web-side application server 244 can make a call to exemplary function foo( ) to web server 242. The call to function foo( ) can cause web server 242 to instruct the browser to draw a user interface item (e.g., a button). At stage 368, web server 242 can instruct the browser to draw the user interface item and present the user interface item for display. Each user interface item can be associated with a unique identifier. When a user interacts with the user interface item, the identifier can facilitate identification of the user interface item by various servers.

The browser can now display the user interface item, which is interactive. In this example, the user interface item can be defined by or associated with a custom logic script configured to switch the user to a different layout, "Layout B" when clicked. The browser can receive a user input for interacting with the user interface item (e.g., a click on the button). At stage 370, the browser can send a request to web server 242. The request can include identifier 305 of the user interface item.

Upon receiving the response, at stage 372, web server 242 can send identifier 305 to web-side application server 244 in notification 306. In response, at stage 374, web-side application server 244 can send notification 308 to database-side application server 246. Notification 308 can include an exemplary function call bar(ID) in which identifier 305 is a parameter. By sending notification 308, web-side application server 244 can notify database-side application server 246 the occurrence of the user action on the user interface item.

Upon receiving notification 308, at stage 376, database-side application server 246 can send notification 310 to database server 248. Notification 310 is operable to inform database server 248 that the user interacted with the user interface item and a custom logic associated with the user interface item should apply. Notification 310 can include the identifier 305 and a reference to a script for applying Layout B. The script can be stored in database 254.

Database server 248 can execute the script and switch to Layout B. Database server 248 can, at stage 378, post notification 312. Notification 312 can include a message indicating that a state of database server 248 has changed. Notification 312 can have a label, e.g., "layout change" that can identify a type of state change that triggered notification 312. Database server 248 can post multiple notifications about the state change.

Database-side application server 246 can receive notification 312. Upon reception of notification 312, database-side application server 246 can optimize, simplify, or translate notification 312. For example, database-side application server 246 can remove a duplicate notification, remove a first notification when a second notification makes the first notification obsolete, or translate a notification from a first format to a second format. Additionally, database-side application server 246 can generate another notification, e.g., notification 314, for sending to web-side application server 244. Notification 314 can include optimized, simplified, or translated notification 312.

At stage 380, web-side application server 244 can receive notification 314. Upon receiving notification 314, web-side application server 244 can changes the user's current layout from Layout A to Layout B. Web-side application server 244 can gather most recent information on configurations of Layout B. At stage 382, web-side application server 244 can make an RIA call (e.g., foo2( )) to web server 242 to draw a user interface according to Layout B. At stage 384, web server 242 can send the newly drawn user interface to the browser using push technology. The operations including stages 362 through 384, which are based on notifications, can make each of client 228 and database 254 unblocked while one request is processed. Accordingly, while the request is processed, each of client 228 and database 254 can be free to process other requests.

Asynchronous Communication Layer

Figure 4:
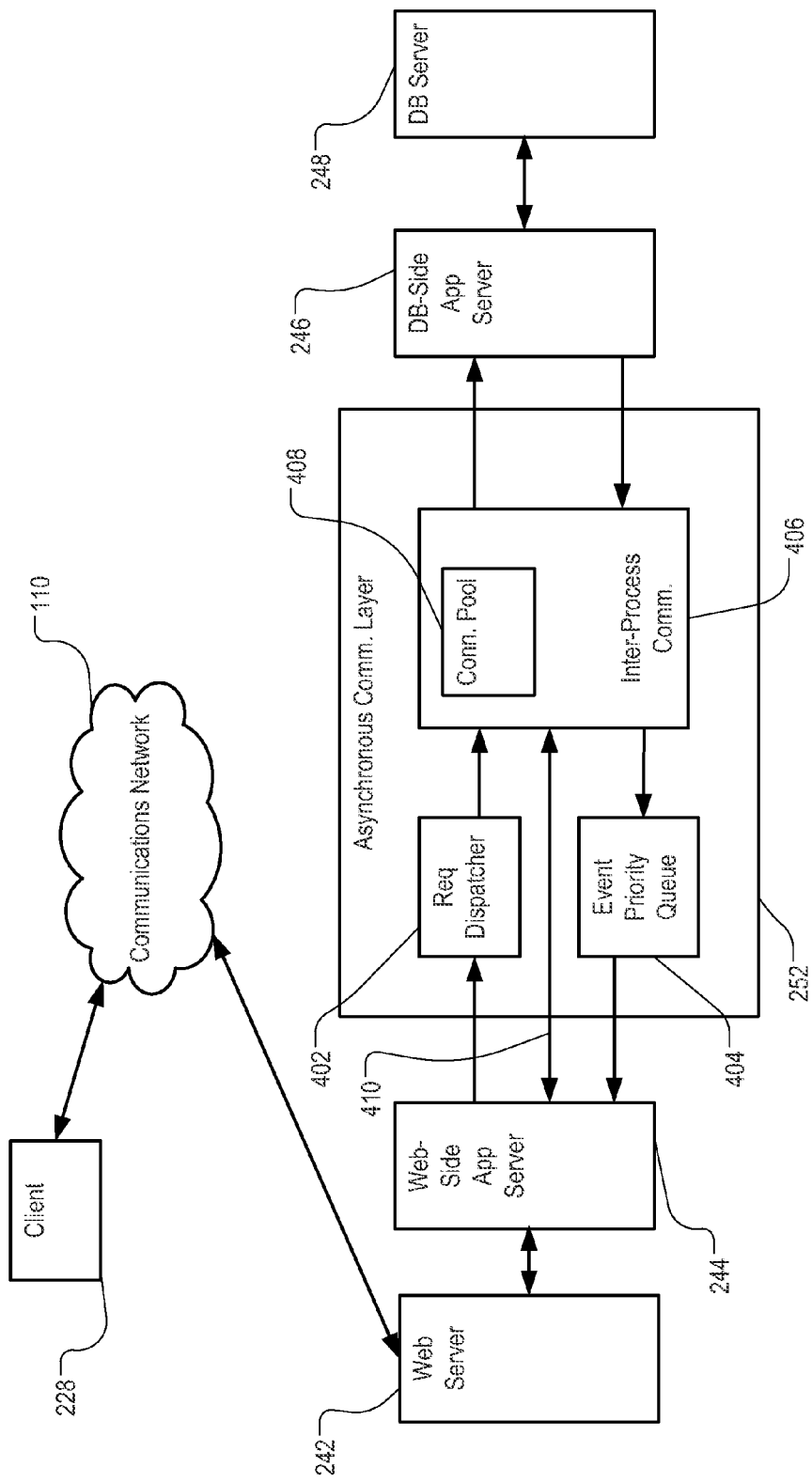
FIG. 4 is a block diagram illustrating an exemplary asynchronous communication layer in notification-based request processing.

FIG. 4 is a block diagram illustrating exemplary asynchronous communication layer 252 in notification-based request processing. Asynchronous communication layer 252 can include request dispatcher 402, event priority queue 404, and inter-process communication layer 406.

Request dispatcher 402 is a software component of asynchronous communication layer 252 configured to cause one or more computers to perform operations of managing requests from client 228 received through web server 242 and web-side application server 244. Request dispatcher 402 can receive the requests, determine a priority of each request, and send the requests to inter-process communication layer 406 based on the priorities. Request dispatcher 402 can facilitate asynchronous communication. An order in which request dispatcher 402 sends requests to inter-process communication layer 406 can be based on the priorities, in addition or as an alternative to a temporal order in which request dispatcher 402 receives the request.

Inter-process communication layer 406 is a software component of asynchronous communication layer 252 configured to cause one or more computers to perform operations to facilitate cross-language communication between processes or services that are based on different languages. Inter-process communication layer 406 can include connection pool 408 for managing multiple connections between asynchronous communication layer 252 and database-side application server 246. Inter-process communication layer 406 can include other components that will be described in further detail below.

In some modes of communications, inter-process communication layer 406 can receive a request from and send a response to web-side application server 244 through connection 410. Connection 410 can be utilized to facilitate synchronous communication when synchronous communication is more effective. In some implementations, inter-process communication layer 406 can be implemented using Apache Thrift™ technologies.

Event priority queue 404 is a component of asynchronous communication layer 252 programmed to perform operations of managing event notifications from database server 248 received through database-side application server 246 and inter-process communication layer 406. Event priority queue 404 can include a queue data structure configured to store event notifications and a managing component configured to manage the event notifications stored in the storage structure. The managing component of event priority queue 404 can receive the event notifications, determine a priority of each event notification, entering the event notifications into the queue data structure based on the priorities, and send the event notifications to web-side application server 244 from a head of the queue data structure. Event priority queue 404 can facilitate asynchronous communication. An order in which event priority queue 404 sends event notifications to web-side application server can be based on the priorities, in addition or as an alternative to a temporal order in which event priority queue 404 receives the event notifications.

Smart Messages

Figure 5:
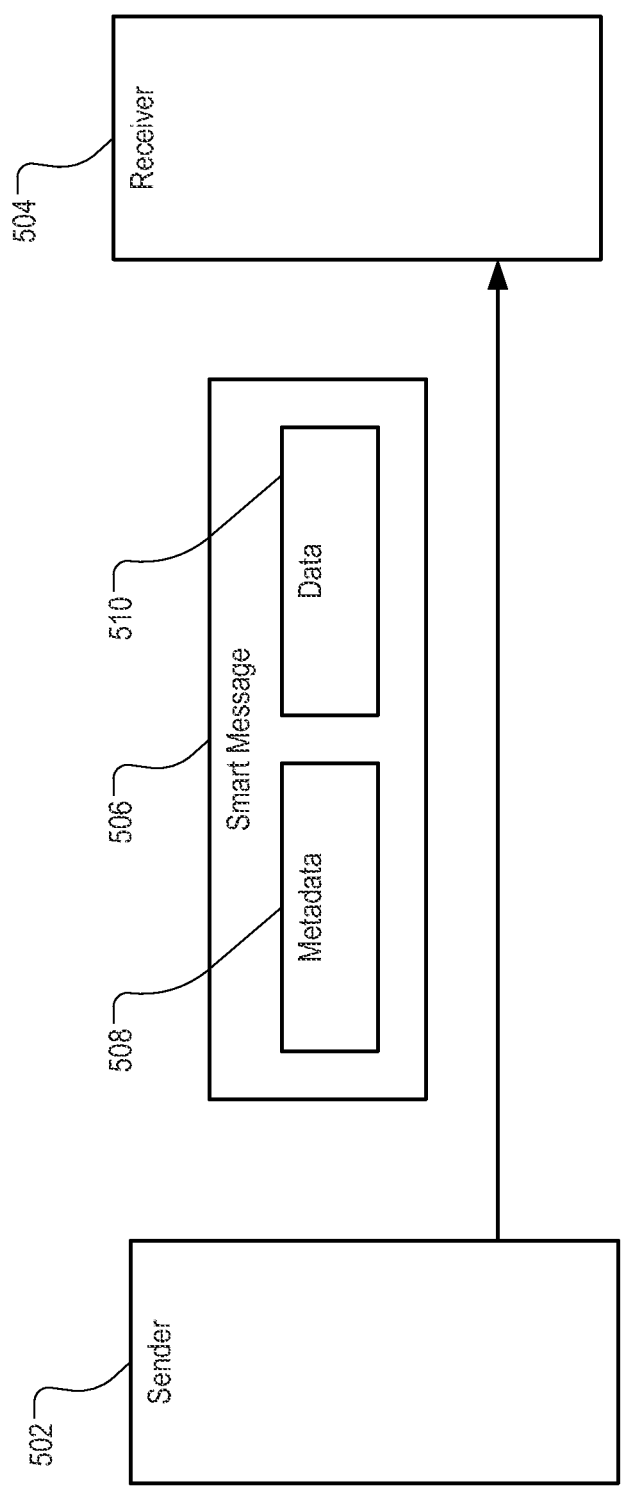
FIG. 5 is a block diagram illustrating and exemplary communication scheme utilizing smart messages.

FIG. 5 is a block diagram illustrating and exemplary event-based communication paradigm utilizing smart messages. An event notification can be in the form of a smart message. Smart message 506 can have a well-defined format according to a protocol followed by communications between sender 502 and receiver 504.

The framework described in this specification has a duality characteristic where each component of the framework can act as both a server and a client of another component, depending on who initiated a communication. Accordingly, each of sender 502 and receiver 504 can include any of client 228, web server 242, web-side application server 244, database-side application server 246, or database server 248.

An event notification from sender 502 to receiver 504 can include smart message 506. Smart message 506 can include metadata 508 and data 510. Metadata 508 can include information that provides instructions to receiver 504 as to which action can be performed regarding the event notification. Data 510 can include information that sender 502 requests to send to receiver 504. For example, data 510 can include a request, a response, or any other information to be passed by the event notification.

Figure 6:
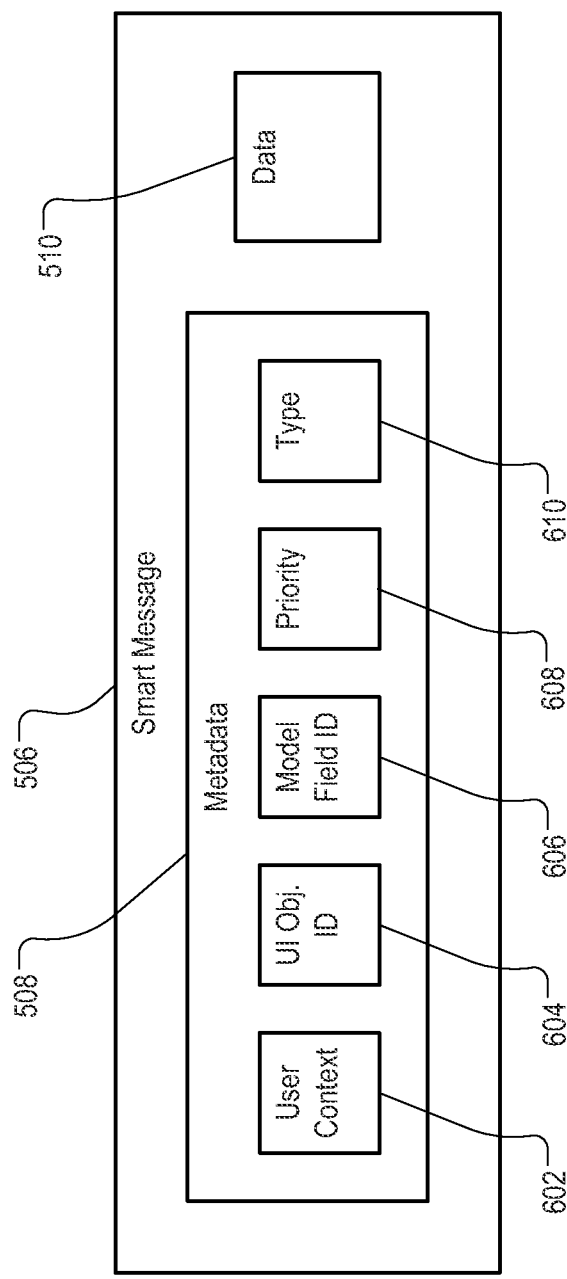
FIG. 6 is a block diagram illustrating a structure of an exemplary smart message.

FIG. 6 is a block diagram illustrating a structure of exemplary smart message 506. The structure, or format, smart message 506 can be used to define what actions a sender (e.g., sender 502) requests a receiver (e.g., receiver 504) to perform based on already established protocol between the sender and the receiver.

Smart message 506 can include metadata 508 and data 510. Metadata 508 can include contextual information and meta information. Contextual information can include information generated by a sender of smart message 506. Contextual information can include user context 602. User context 602 can include user-specific information and application relation information. The user-specific information can include a user identifier and a user's privilege settings. The application relation information can include an application identifier identifying the web application currently being executed or modified, a session identifier identifying a current session, or both.

Meta information can include user interface object identifier 604. When smart message 506 carries data 510 that are related to a user interface item, user interface object identifier 604 can carry an identifier unique to the user interface item. The user interface item can be an item that causes smart message 506 to be sent (e.g., a button clicked), or an item that smart message 506 is designated to modify (e.g., a button to be drawn or changed).

Meta information can include model field identifier 606. A user interface item (e.g., one having a type "field") can map to a data field (e.g., a column in a table) in a data model of a database. Model field identifier 606 can include an identifier of the data field.

Meta information can include priority 608. Priority 608 can be a value indicating the priority according to which a receiver is responsible for processing smart message 506. In some implementations, the receiver can enter smart message 506 into a queue based on priority 608 or on a combination of priority 608 and a timestamp. A higher priority can cause a smart message to be entered at a position closer to the head of the queue.

Meta information can include message type 610. Message type 610 can be a value indicating a protocol-specific type of smart message 506. Based on message type 610, a receiver can perform type-specific actions to process smart message 506. Value of message type 610 (e.g., "synchronous" or "asynchronous") can include an indicator on whether smart message 506 has a synchronous type. The "synchronous" value of message type 610 can indicate to the receiver that the receiver is responsible for processing smart message 506 before processing a next smart message, and that the sender is blocked (waiting until processing is complete). The "asynchronous" value of message type 610 can indicate to the receiver that the receiver can process smart message 506 at a later point in time, and that the sender is not blocked.

Communication Between a Client and a Web Server

Figure 7:
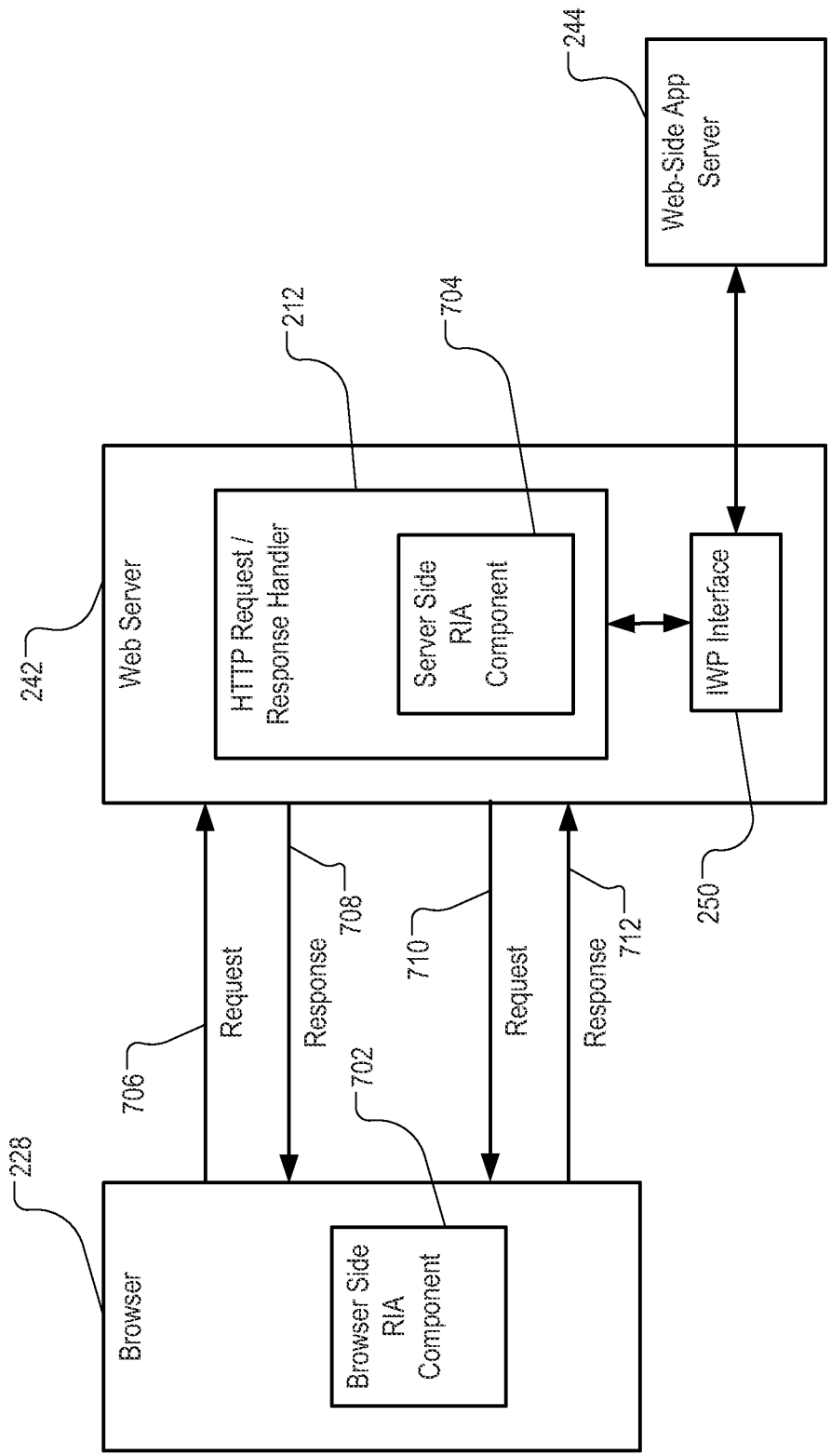
FIG. 7 is a block diagram illustrating modes of communications between a client and web server.

FIG. 7 is a block diagram illustrating modes of communications between client 228 and web server 242. Client 228 can include a web browser executing on a user device. The browser can include browser side RIA component 702. Browser side RIA component 702 can include a plugin (also known as a browser extension) of client 228 that extends functions of a browser such that the browser can receive and process a request from web server 242. Browser side RIA component 702 can include a JavaScript frontend based on a web development framework.

Web server 242 can include HTTP request handler 212, which can include server side RIA component 704 that extends functions of a conventional HTTP request handler such that HTTP request handler 212 can send a request to client 228. Working in coordination, browser side RIA component 702 and server side RIA component 704 can facilitate a first mode of communication where client 228 sends request 706 to web server 242, and receives response 708 from web server 242. In addition, browser side RIA component 702 and server side RIA component 704 can facilitate a second mode of communication where web server 242 sends request 710 to client 228, and receives response 712 from client 228. Request 706 and response 712 can be in a descriptive language such as XML, Ajax, or user interface description language (UIDL).

The first and second modes of communication can allow web server 242 (and other servers in the system) to have control of client 228. For example, web server 242 can be configured to drive a browser, include pausing, resuming, sending user interface to, and requesting response from, a dynamic component executing in the browser. From a user's perspective, client 228 can act as a server that can respond to a request from web server 242 and send state information to the web server 242.

Figure 8A:
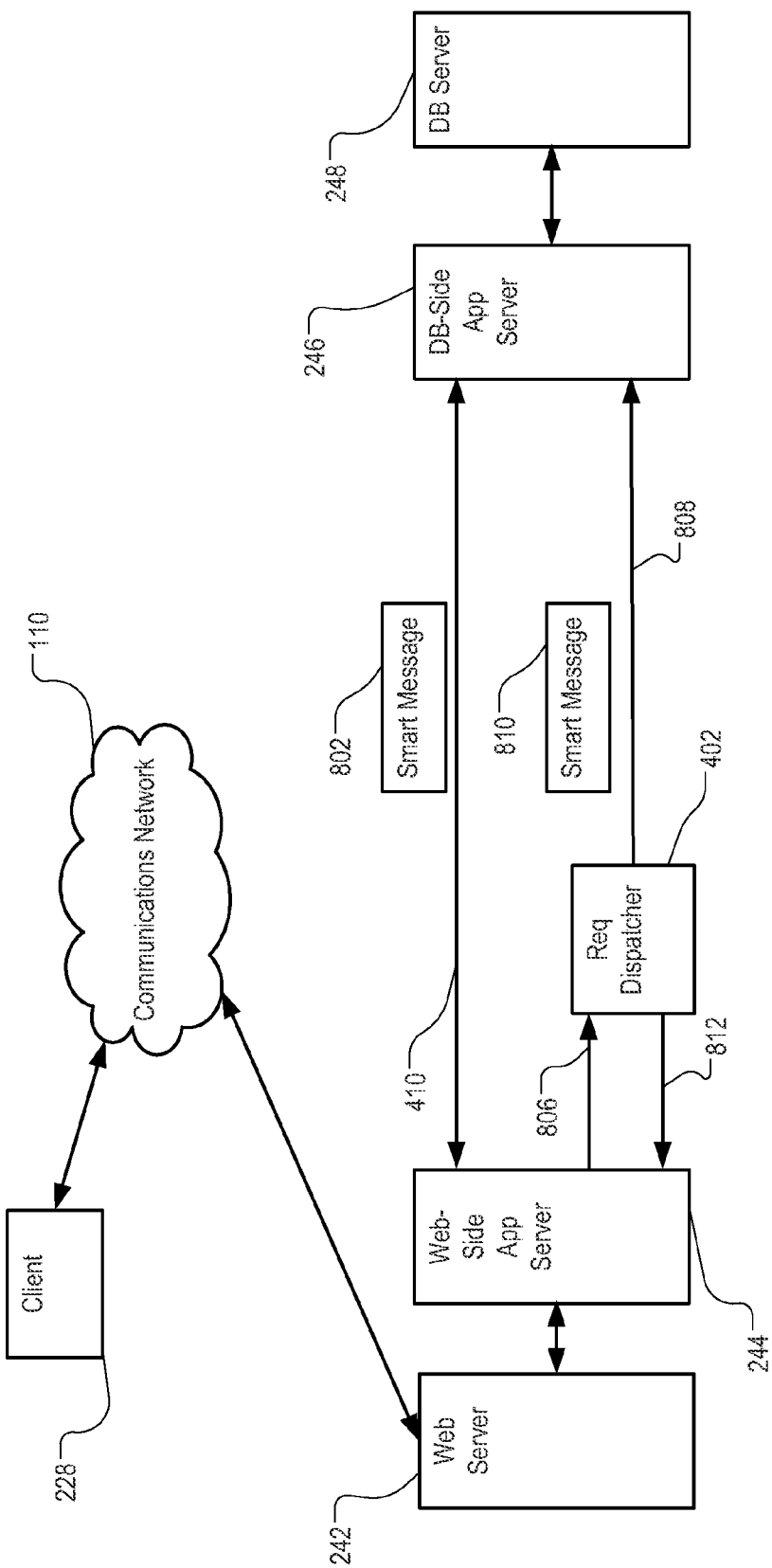
FIG. 8A is a block diagram illustrating exemplary client-initiated communication.

FIG. 8A is a block diagram illustrating exemplary client-initiated communication. Client 228 can initiate communication with database server 248, in either synchronous or asynchronous mode, through various intermediate components. A notification, in the form of a smart message can be used in both synchronous and asynchronous communication modes.

In a synchronous communication mode, web-side application server 244, as one of the intermediate components, can initiate communication with database-side application server 246, as another intermediate component, upon receiving a request from client 228 through web server 242. Web-side application server 244 can open connection 410 to database-side application server 246. Web-side application server 244 can generate smart message 802. Smart message 802 can have a format as described above in reference to FIG. 6. Smart message 802 can have a "synchronous" message type. Through connection 410 managed by an inter-process communication layer (e.g., inter-process communication layer as described above in reference to FIG. 4), web-side application server 244 can send smart message 802 to database-side application server 246. Web-side application server 244 can then waits for a response from database-side application server 246.

While web-side application server 244 waits for a response, client 228 can be blocked from sending another request. Database-side application server 246 and database server 248 can perform operations based on data in smart message 802 and send a response through connection 410. Upon receiving the response from connection 410, web-side application server 244 can send a response to client 228 and unblock client 228. Client 228, now unblocked, can send another request.

In an asynchronous communication mode, web-side application server 244 can make dispatch request 806 upon receiving a client-initiated request. Web-side application server 244 can send dispatch request 806 to request dispatcher 402. Request dispatcher 402 can open connection 808 to database-side application server 246. Request dispatcher 402 can generate smart message 810. Smart message 810 can have a format as described above in reference to FIG. 6. Smart message 810 can have an "asynchronous" message type. Through connection 808 managed by an inter-process communication layer (e.g., inter-process communication layer as described above in reference to FIG. 4), request dispatcher 402 can send smart message 810 to database-side application server 246.

Database-side application server 246 and database server 248 can perform operations based on data in smart message 810 and send a response through connection 808. Upon receiving the response from connection 808, request dispatcher 402 can send a notification to web-side application server 244. Web-side application server 244 can initiate communication with client 228 through web server 242. Initiating the communication can include opening a new connection to client 228 and sending the notification as a request to client 228 through the new connection.

In the asynchronous communication mode, web-side application server 244 need not wait for a response from database-side application server 246. Request dispatcher 402 can send response 812 to web-side application server 244 informing web-side application server 244 that request 806 is processed, even when database-side application server 246 is still processing smart message 810. Upon receiving response 812, web-side application server 244 can unblock client 228. Response 812 can cause client 228 to be unblocked. In the asynchronous communication mode, client 228, once unblocked, can send another request before receiving a response to the first request.

Figure 8B:
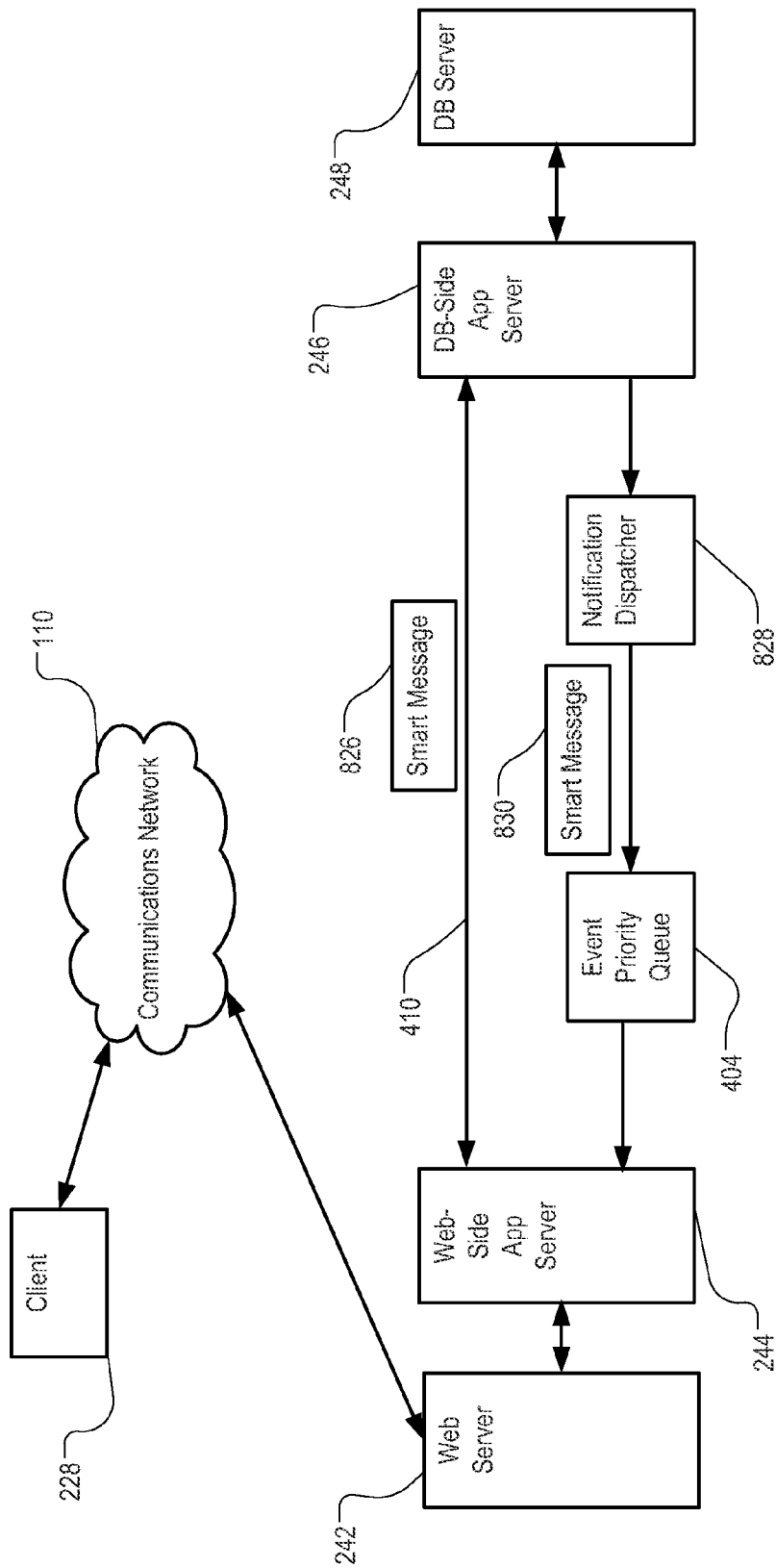
FIG. 8B is a block diagram illustrating exemplary server-initiated communication.

FIG. 8B is a block diagram illustrating exemplary server-initiated communication. Database server 248 can initiate communication to client 228 through various intermediate components in both synchronous and asynchronous modes. A notification, in the form of a smart message, is used in both communication modes.

In a synchronous communication mode, database-side application server 246 can initiate communication with web-side application server 244 upon receiving a request from database server 248. Database-side application server 246 can open connection 410 to web-side application server 244. Database-side application server 246 can generate smart message 826. Smart message 826 can have a format as described above in reference to FIG. 6. Smart message 826 can have a "synchronous" message type. Through connection 410 managed by an inter-process communication layer (e.g., inter-process communication layer as described in reference to FIG. 4), database-side application server 246 can send smart message 826 to web-side application server 244. Database-side application server 246 can then wait for a response from web-side application server 244.

While database-side application server 246 waits for a response, web-side application server 244 can initiate communication with client 228 through web server 242. Web-side application server 244 can generate one or more user interface items and corresponding user interface item identifiers based on data in smart message 826. Web-side application server 244 can generate action logic to be associated with each user interface item. Web-side application server 244 can then send the user interface items and action logic client 228 through push operations. Web-side application server 244 can receive a response from client 228 (e.g., when a user performs an action on one of the user interface items in a browser). Upon receiving the response from client 228, web-side application server 244 can send a response to database-side application server 246 through connection 410.

While database-side application server 246 waits for a response, database server 248 can be blocked from sending another request. Database-side application server 246 and database server 248 can perform operations based on data in smart message 802 and send a response through connection 410. Upon receiving the response from connection 410, database-side application server 246 can send a notification to database server 248 and unblock database server 248. Database server 248, now unblocked, can send another request.

In an asynchronous communication mode, database-side application server 246 can receive a request from database server 248. Upon receiving the request, database-side application server 246 can send a notification to notification dispatcher 828. Notification dispatcher 828 can dispatch the notification, in the form of smart message 830, to event priority queue 404. Smart message 830 can have a format as described above in reference to FIG. 6. Smart message 810 can have an "asynchronous" message type. Web-side application server 244 can receive smart message 830 from event priority queue 404. Through web server 242, web-side application server 244 can open a new connection to client 228. Based on data in smart message 830, web-side application server 244 can then send data or notification to client 228 for rendering.

In the asynchronous communication mode, database-side application server 246 need not wait for a response from web-side application server 244. Notification dispatcher 828 can send a response (in the form of a notification) to database-side application server 246 informing database-side application server 246 that smart message 830 is processed, even when web-side application server 244 is still processing smart message 830. Upon receiving the response, database-side application server 246 can unblock database server 248. In the asynchronous communication mode, database server 248, once unblocked, can send another request before receiving a response to the first request.

Figure 9:
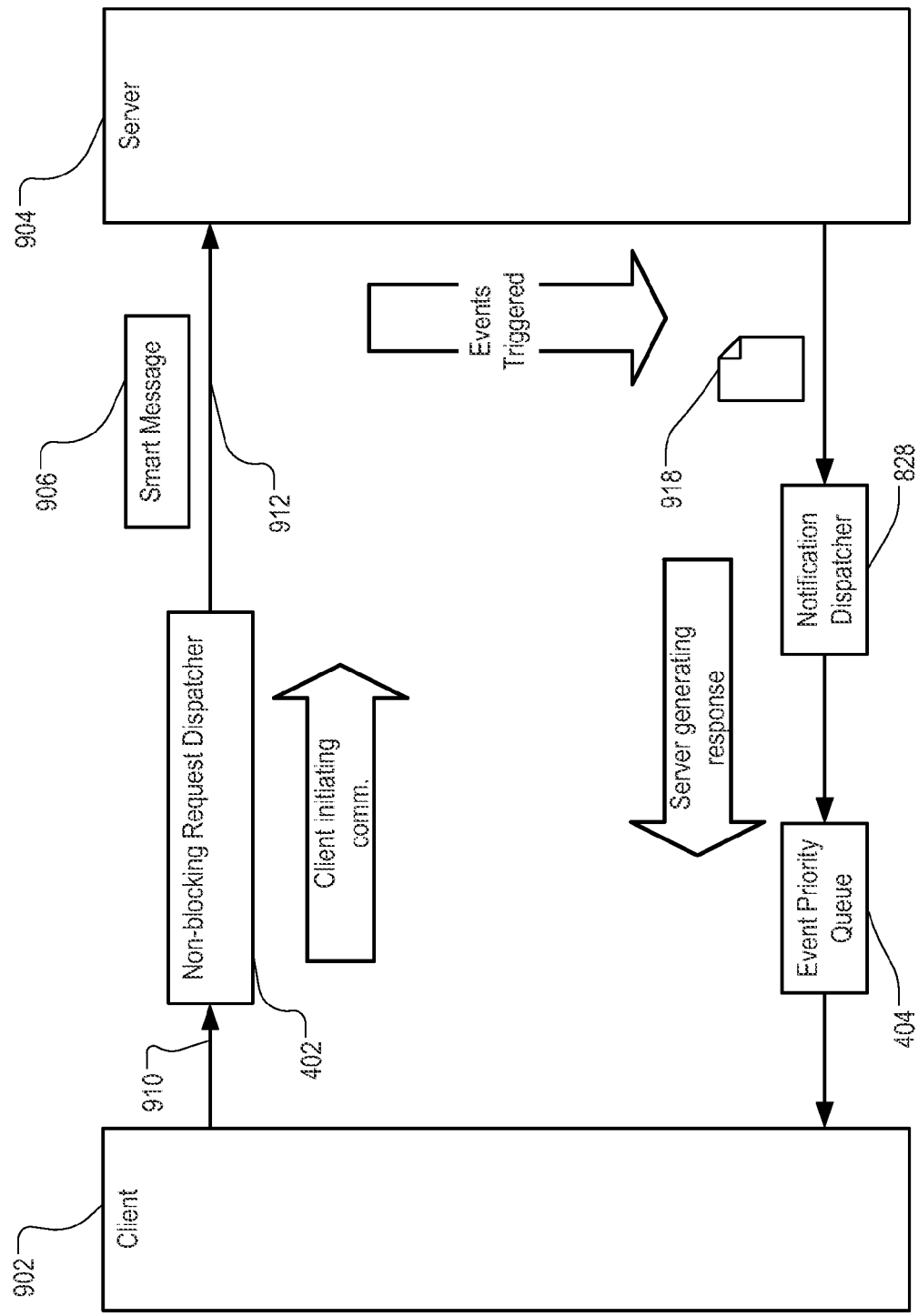
FIG. 9 is a block diagram illustrating an exemplary asynchronous mode of communication.

FIG. 9 is a block diagram illustrating an exemplary asynchronous mode of communication. An exemplary system implementing the asynchronous mode of communication can include client 902 and server 904. Each of client 902 and server 904 can by any of client 228, web server 242, web-side application server 244, database-side application server 246, or database server 248 as described above in reference to FIG. 2.

Client 902 can send an initial request to server 904 using first connection 910 through request dispatcher 402. The initial request can be a smart message. Client 902 can automatically determine that the initial request is to be processed in asynchronous communication mode at run time, and upon making such determination, specifying the communication mode in metadata in the smart message as a message type of the smart message. After client 902 sends the initial request, client 902 can be unblocked from the initial request, and can send an additional request or receive an event notification from any connections. Request dispatcher 402 can return to client 902 first connection 910 through which request dispatcher 402 received the initial request, causing client 902 to free first connection 910 and to free an application thread managing first connection 910. Freeing first connection 910 and the application thread can unblock client 902.

Request dispatcher 402 can send smart message 906 to server 904, passing the metadata (including information on communication mode) to server 904. Request dispatcher 402 can send smart message 906 through synchronous connection 912. Upon receiving smart message 906, server 904 can trigger an event, including, for example, a changing of states of server 904. Server 904 can generate event notification 918 as a response. Upon generating event notification 918, server 904 can free synchronous connection 912.

Server 904 can send the response to client 902 asynchronously, after a delay from the time the request was received, and through a second connection. Server 904 can change states anytime (based on a backend event or an event from another browser). Accordingly, the response can appear to be occurring randomly. Server 904 can send the response to client 902 through notification dispatcher 828 and event priority queue 404. The original first connection 910 may or may not have been freed already. The response can be sent to client 228 through a new connection initiated by server 904, or reuse an existing connection if the existing connection has not been freed yet.

Figure 10:
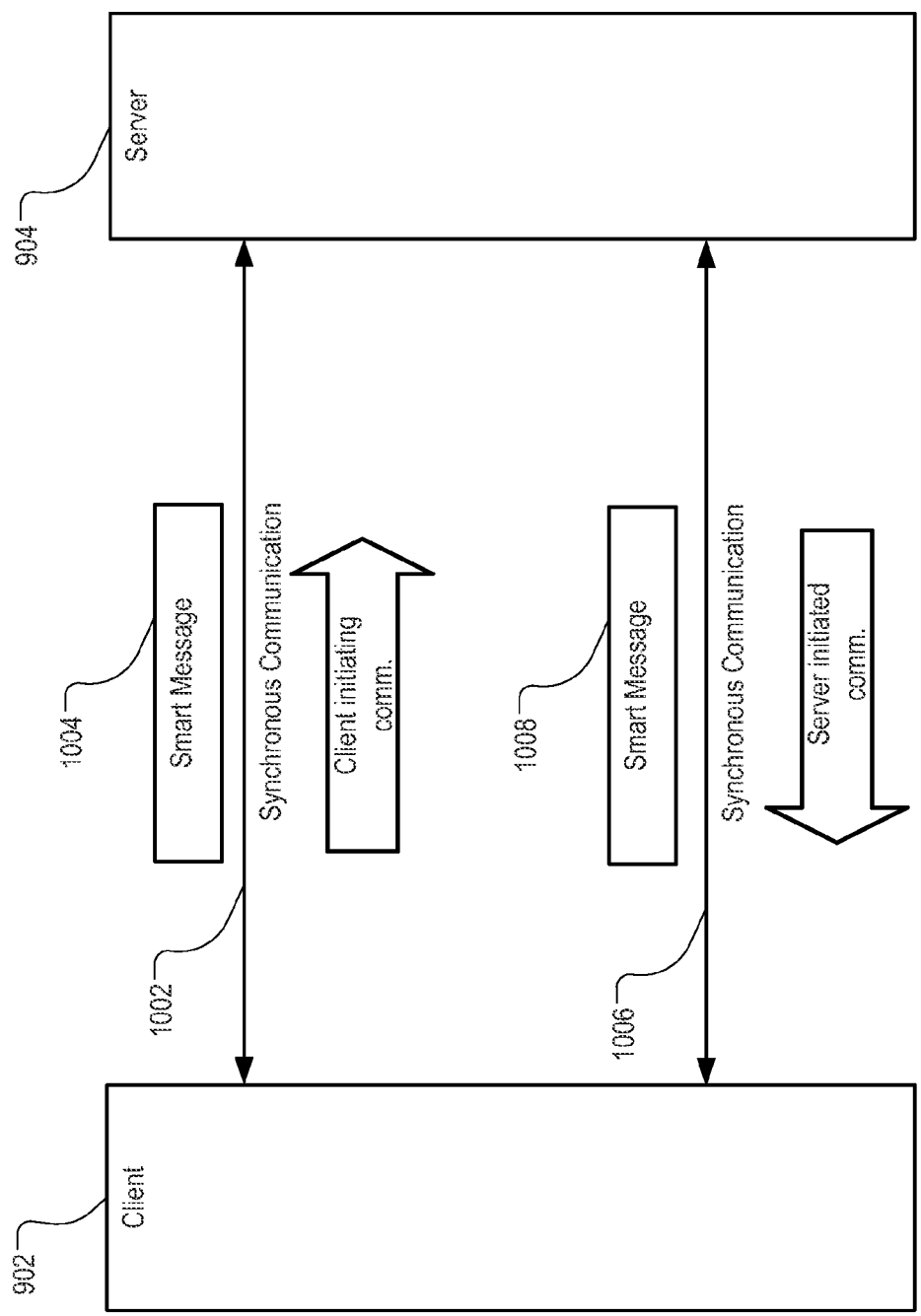
FIG. 10 is a block diagram illustrating an exemplary synchronous mode of communication.

FIG. 10 is a block diagram illustrating an exemplary synchronous mode of communication. An exemplary system implementing the asynchronous mode of communication can include client 902 and server 904. Each of client 902 and server 904 can by any of client 228, web server 242, web-side application server 244, database-side application server 246, or database server 248 as described above in reference to FIG. 2.

In the synchronous mode of communication, client 902 can initiate the communication. Client 902 can send a client request to server 904 at any time using synchronous connection 1002. The client request can be in the form of smart message 1004. Client 902 can automatically determine that the client request is to be processed in synchronous communication mode at run time. The decision as whether to use synchronous communication mode or to use asynchronous communication mode can be stored in the meta information in smart messages 1004 as a message type. Server 904 can process the client request and provide a response through synchronous connection 1002.

Likewise, server 904 can initiate communication and send a server request to client 902 through connection 1006. The server request can be in the form of smart message 1008. Client 902 can respond to the server request using connection 1006. In communications between client 902 and server 904, a request and a response need not be sent in the same communication mode. Client 902 can send a request in synchronous communication mode, for which server can respond in asynchronous communication mode, and vice versa. The communication modes can be controlled by metadata in the smart messages.

State Management

Figure 11A:
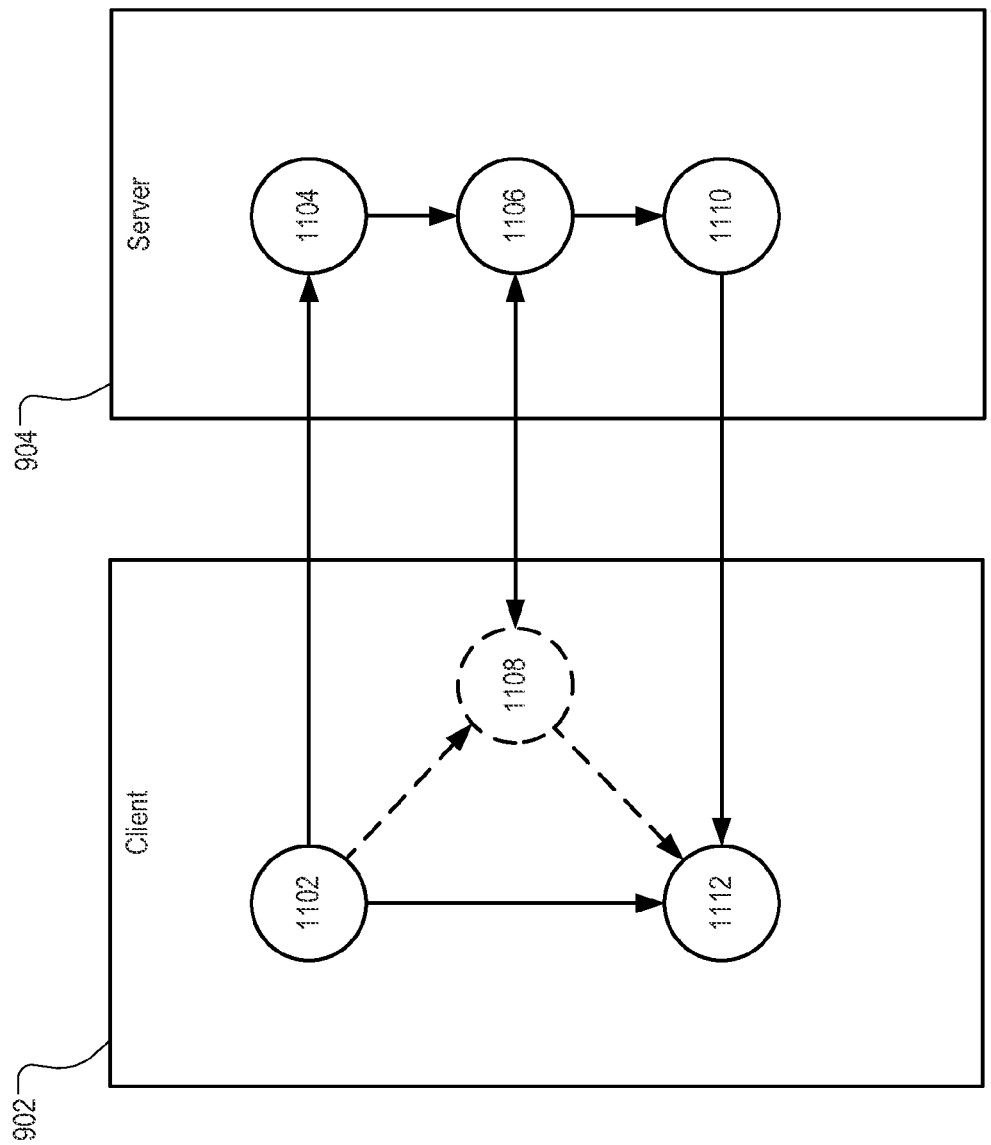
FIGS. 11A and 11B are diagrams illustrating exemplary techniques of managing states of a client and a server.

FIG. 11A is a diagram illustrating an overview of exemplary techniques of managing states of a client and a server. In a system implementing the techniques described in this specification, each of a client or a server can initiate a request at any time to the other asynchronously. In addition, each of the client or the server can control a state of the other using the request.

A web application executing on the system can be configured to perform an action based on a given user input. The action can include, for example, execution of a specific script trigger, e.g., a routine configured to monitor a specified event and cause a specified script to execute when the event occurs. Client 902 (e.g., a browser) can be configured to receive the user input. At the time client 902 receives the user input, client 902 can be in state 1102. Upon receiving the user input, client 902 can send a first notification to server 904. At the time server 904 receives the notification, server 904 can be in state 1104.

Upon receiving the user input, server 904 can execute the script trigger and enter state 1106. At state 1106, server 904 may request client 902 to perform certain actions (e.g., error checking, validation, or pausing). Server 904 can send a second notification to client 902. The second notification can be configured to cause client 902 to change from state 1102 to state 1108. In state 1108, client 902 may or may not provide a display update in a browser to inform a user that client 902 is in state 1108. Client 902 can perform the requested actions in state 1108, and notify server 904 upon completion of the actions using a third notification.

Upon receiving the third notification, server 904 can continue processing and change from state 1106 to state 1110. Upon changing to state 1110, server 904 can send a fourth notification to client 902. The fourth notification can include a result of executing the script trigger. Upon receiving the fourth notification, client 902 can change from state 1108 to state 1112. In state 1112, client 902 can provide information for display in a browser.

Each of the first, second, third, and fourth notification can be sent in either synchronous or asynchronous mode. During the state changes at client 902 and server 904, client 902 can be blocked or unblocked at each stage of communication. At least one of server 904 or client 902 can maintain a state machine tracking the states of one or both of server 904 and client 902.

Figure 11B:
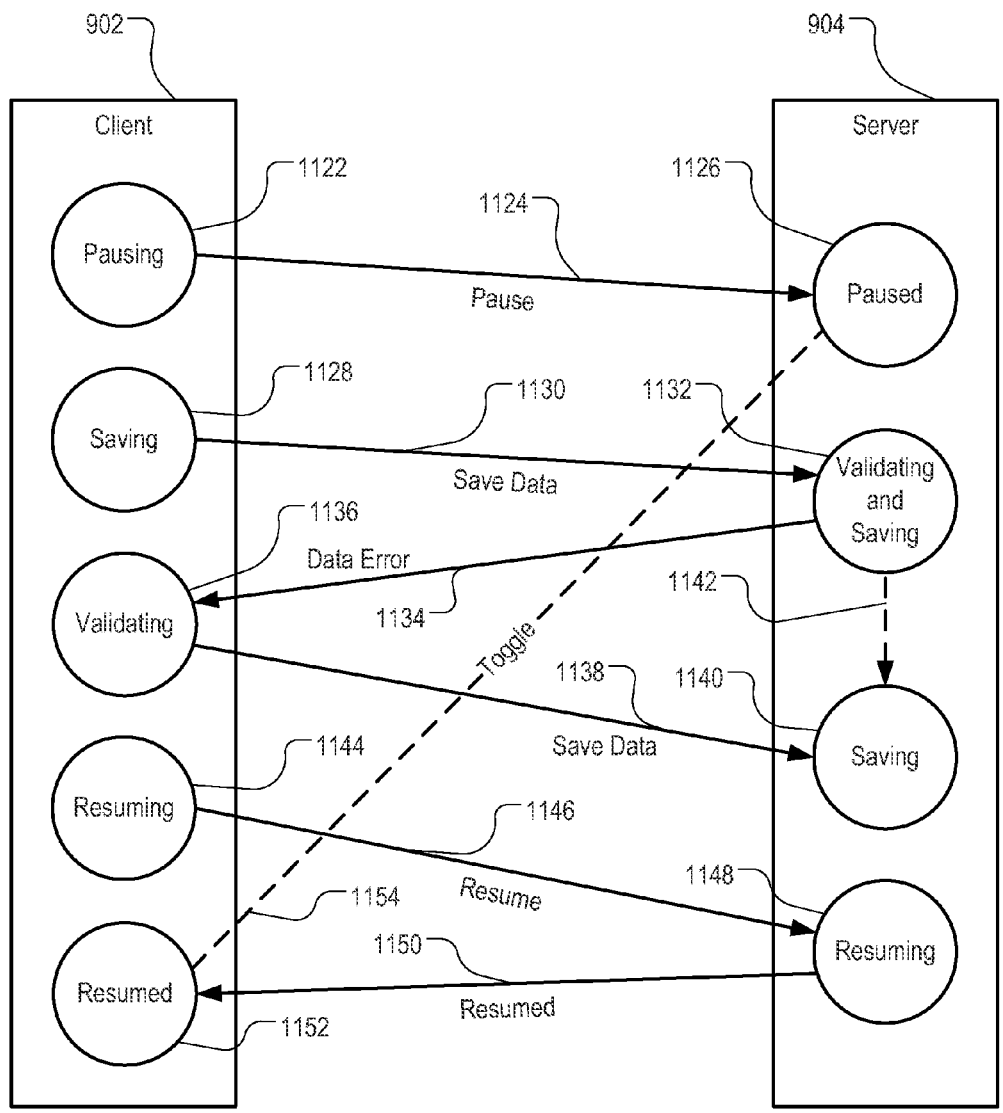

FIG. 11B is a block diagram illustrating exemplary states of a client and a server. The states are illustrated using the following example. A web application can execute on a system including client 902 and server 904. The web application is configured to execute a script trigger. The script trigger can be configured to monitor a user input including a user interaction on a user interface item (e.g., entering text in a text field, or saving the entered text). The script trigger can execute a script on server 904 when triggered by the user input. Client 902 can receive the user input, and send a notification to server 904 upon the user input.

Server 904 can execute the script upon receiving the notification. When server 904 executes the script, client 902 can enter state 1122, which can be a "pausing" state. Client 902 can enter "pausing" state 1122 when client 902 receives a user input to pause client 902, or when the script being executed sends a notification to pause client 902. In "pausing" state 1112, a series of operations (e.g., updating multiple data fields) being performed on client 902 are paused. When client 902 is in "pausing" state 1122, client 902 can send "pause" notification 1124 to server 904 to request server 904 to pause execution of a script related to the series of operations being paused on client 902.

When server 904 receives "pause" notification 1124, server 904 can enter state 1126, which can be a "paused" state. When server 904 is in "paused" state 1126, server 904 can pause the execution of the script. In some implementations, when server 904 enters "paused" state 1126, server 904 can send a notification to client 902 to inform client 902 that server 904 is in "paused" state 1126.

When client 902 receives the notification that server 904 is in paused state 1126, client 902 can perform other actions. For example, client 902 can receive user input requesting saving data in the web application. In response, client 902 can enter state 1128, which can be a "saving" state. When client 902 is in "saving" state 1128, client 902 can send "save data" notification 1130 to server 904. When server 904 receives "save data" notification 1130, server 904 can determine whether there are any dirty data (e.g., data that have been modified since last save) to be saved, and if so, whether server 904 shall validate the dirty data. Based on the determination, server 904 can enter state 1132, which can be a "validating and saving" state. Server 904 can be in multiple states concurrently (e.g., "paused" state 1126 and "validating and saving" state 1132). Server 904 can include a state manager managing the multiple states and transition between the states. The state manager can control execution of various procedures on server 904.

When server 904 is in "validating and saving" state 1132, server 904 can perform operations of validating the data in preparation for saving, for example, when the data appears erroneous (e.g., out of range) to server 904. Based on characteristics of the data, server 904 can notify client 902 to validate the data, for example, by sending "data error" notification 1134 to client 902. "Data error" notification 1134 can include one or more identifiers indicating what data to validate and description of what operations are to be performed to validate the data. "Data error" notification 1134 is operable to cause client 902, upon reception, to enter state 1136, which can be a "validating" state. In "validating" state 1136, client 902 can perform data validation by performing the specified operations on the identified data. Client 902 can be in multiple states concurrently. For example, client 902 can, at the same time, be in "pausing" state 1122, "saving" state 1128, and "validating" state 1136. Client 902 can include a state manager managing the multiple states and transition between the states. The state manager can control execution of various procedures on client 902.

Once client 902 performed the operations to validate the data, client 902 can send a second "save data" notification 1138 to server 904. "Save data" notification 1138 can include information indicating that client 902 validated the data to be saved. Upon receiving "save data" notification 1138, server 904 can enter "saving" state 1140. In "saving" state 1140, server 904 can save the data. If, in "validating and saving" state 1132, server 904 determines that the data need not be validated, server 904 can transition (1142) from "validating and saving" state 1132 to "saving" state 1140 without requesting client 902 to validate the data.

Client 902 can receive a user input to resume from "pausing" state 1122, for example, by resuming the paused series of operations. Upon receiving the user input, client 902 can enter "resuming" state 1144. In "resuming" state 1144, client 902 can send "resume" notification 1146 to server 904. "Resume" notification 1146 is operable to cause server 904 to resume from a paused state (e.g., the last "paused" state 1126), even when server 904 has gone through multiple interim states.

Upon receiving "resume" notification 1146, server 904 can enter "resuming" state 1148, in which a state manager resumes executing the script that was paused. When server 904 has resumed the execution, server 904 can send "resumed" notification 1150 to client 902, indicating that the execution of the script has been resumed. Upon receiving "resumed" notification 1150, client 902 can enter "resumed" state 1152, in which execution of the series of operations is resumed. By using the notification mechanism, state managers on client 902 and server 904 can coordinate with each other such that client 902 and server 904 can toggle (1154) between "paused" and "resumed" states.

Exemplary Web Application User Interface

Figure 12A:
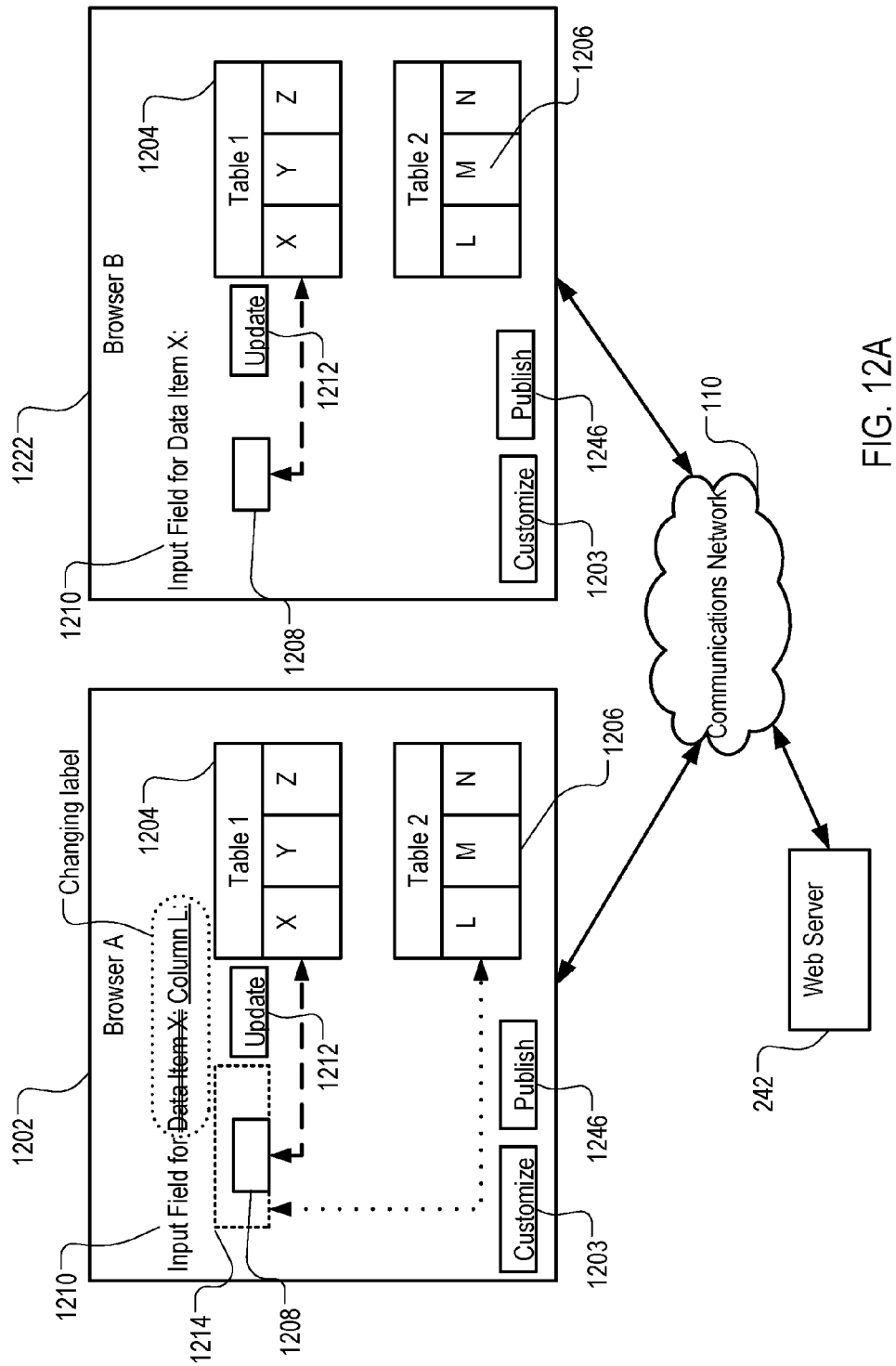
FIGS. 12A and 12B illustrate a user interface of an exemplary web application based on a notification-based web application framework.
Figure 12B:
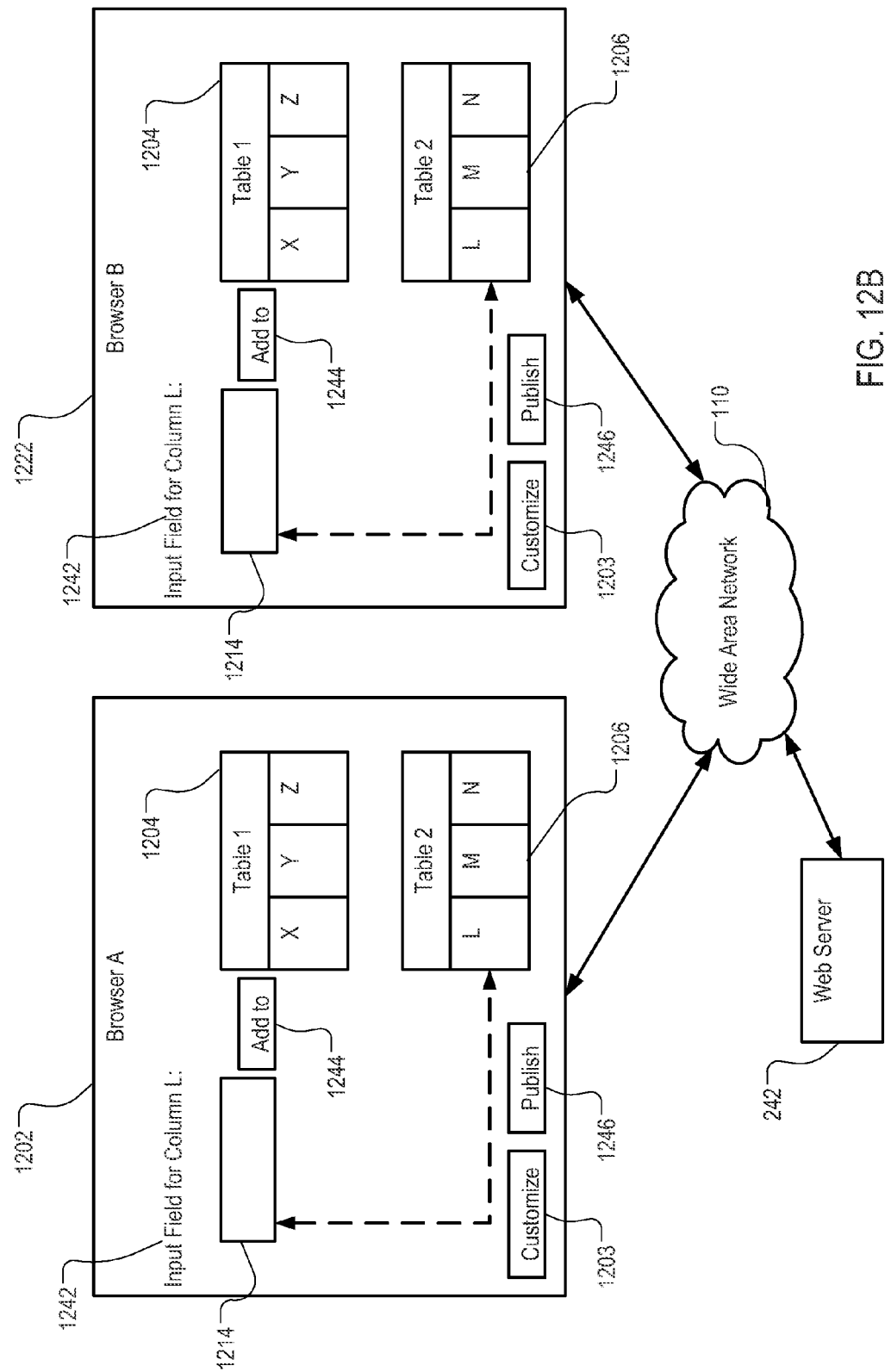

FIGS. 12A and 12B illustrate an exemplary user interface of a customizable web application of a notification-based web application framework. FIG. 12A illustrates the user interfaces as displayed in browser 1202 and browser 1222. Browser 1202 can be a web browser program executing on a first user device connected to web server 242 (as described in reference to FIG. 2A) through communications network 110. Browser 1202 can display a user interface of the web application. The user interface can include multiple user interface items. For example, the user interface can include table 1204 and table 1206. Table 1204 can include a tabular view window of a portion of a first database table including columns X, Y, and Z. A data item of each of columns X, Y, and Z is displayed in table 1204. Table 1206 can include a tabular view window of a portion of a second database table including columns L, M, and N. A data item of each of columns L, M, and N is displayed in table 1206.

The user interface can include text box 1208. Text box 1208 can be an interactive user interface item internally linked to the data item in column X that is displayed in table 1204. The link is represented as dashed arrows. A value of the data item can be displayed in text box 1208. The user interface can include label 1210 "Input Field For Data Item X" that is associated with text box 1208. The user interface can allow a user to edit the value displayed in text box 1208, for example, by receiving from the user a new value in text box 1208. The user interface can include button 1212 "Update," which, when clicked, can cause the data item of column X as displayed in table 1204 to be updated to the new value.

Browser 1222, executing on a second user device, can be connected to web server 242. Browser 1222 can display the same user interface as being displayed in browser 1202.

In addition to allowing a user to edit the value displayed in text box 1208, the user interface displayed in browser 1202, being a front end of a system of notification-based web application framework, can allow a user to edit the look-and-feel of the web application, as well as logic of the web application. The logic can include relationship between first data and second data, relationship between data and a user interface item, behavior of a user interface item, and workflow. Upon receiving a user input for changing operating mode, e.g., a click on button 1203, browser 1202 can enter a customization mode, where browser 1202 can accept inputs for customizing the web application.

In this example, the system can receive various user inputs through the user interface displayed in browser 1202. Upon receiving a first user input for changing label 1210, the web application can change label 1210 from "Input Field for Data Item X" to "Input Field for Column L." The system can facilitate the change by modifying a property (e.g., a "string value" property) stored in a database table, the property being associated with a user interface item identifier of label 1210.

Upon receiving a second user input for modifying which data item text box 1208 represents, the system can modify the link between text box 1208 and a data item as specified by the user input. For example, the system can terminate the link between the data item in column X of table 1204, and create a new link linking text box 1208 to the data item in column L of table 1206 (as indicated by the dotted arrows). The system can facilitate the change to the links by modifying one or more properties stored in a database table, the one or more properties being associated with a user interface item identifier of text box 1208. The one or more properties can specify a data source of text box 1208.

Upon receiving a third user input for resizing text box 1208, the system can resize text box 1208 into text box 1214. The system can facilitate the resizing by modifying one or more properties stored in a database table, the one or more properties being associated with a user interface item identifier of text box 1208. The one or more properties can specify the location, height, and width of text box 1208. Text box 1214 can have a same user interface item identifier as text box 1208.

Upon receiving a fourth user input for changing behavior and label of button 1212, the system can change the behavior and label accordingly. For example, the user input can specify that when button 1212 is clicked, instead of replacing the value of data item in column L of table 1206 with the value in text box 1214, the system can add the value in text box 1214 to the data item in column L of table 1206. The user input can additionally specify that the label on button 1212 be changed from "Update" to "Add to." The system can change the behavior and label according to these specifications. The system can facilitate the change by modifying one or more properties stored in a database table, the one or more properties being associated with a user interface item identifier of button 1212. The one or more properties can specify a script that the web application will execute when button 1212 is clicked. In addition, the one or more properties can specify the label of button 1212.

FIG. 12B illustrates an example user interface of a web application customized as described in reference to FIG. 12A. The customization can occur in browser 1202. After customization, the user interface displayed in browser 1202 can include modified label 1242, resized text box 1214 that is linked to a data item of column L of table 1206, and modified button 1244 having a label "Add to." Button 1244, when clicked, can cause the web application to add a value in text box 1214 to the data item of column L of table 1206. The system implementing a notification-based web application framework can receive a user input through browser 1202 to publish the customization. The user input to publish can include, e.g., a click on button 1246. Upon receiving the input to publish the customization, the system can push the customized user interface to other browsers (e.g., browser 1222) and push the logic change to a backend of the web application. Upon receiving the push, browser 1222 can display the same user interface as being published through browser 1202, and the user interface items will have the same behavior according to changed logic as being published from browser 1202.

Each of browser 1202 and browser 1222 can allow customization and publication of the web application, if a user of each of browser 1202 and browser 1222 is authenticated and authorized to customize and publish. The web application framework can resolve potential conflicts using conventional conflict resolution mechanisms and the blocking communication mode as described above.

Exemplary Web Application Processes

Figure 13:
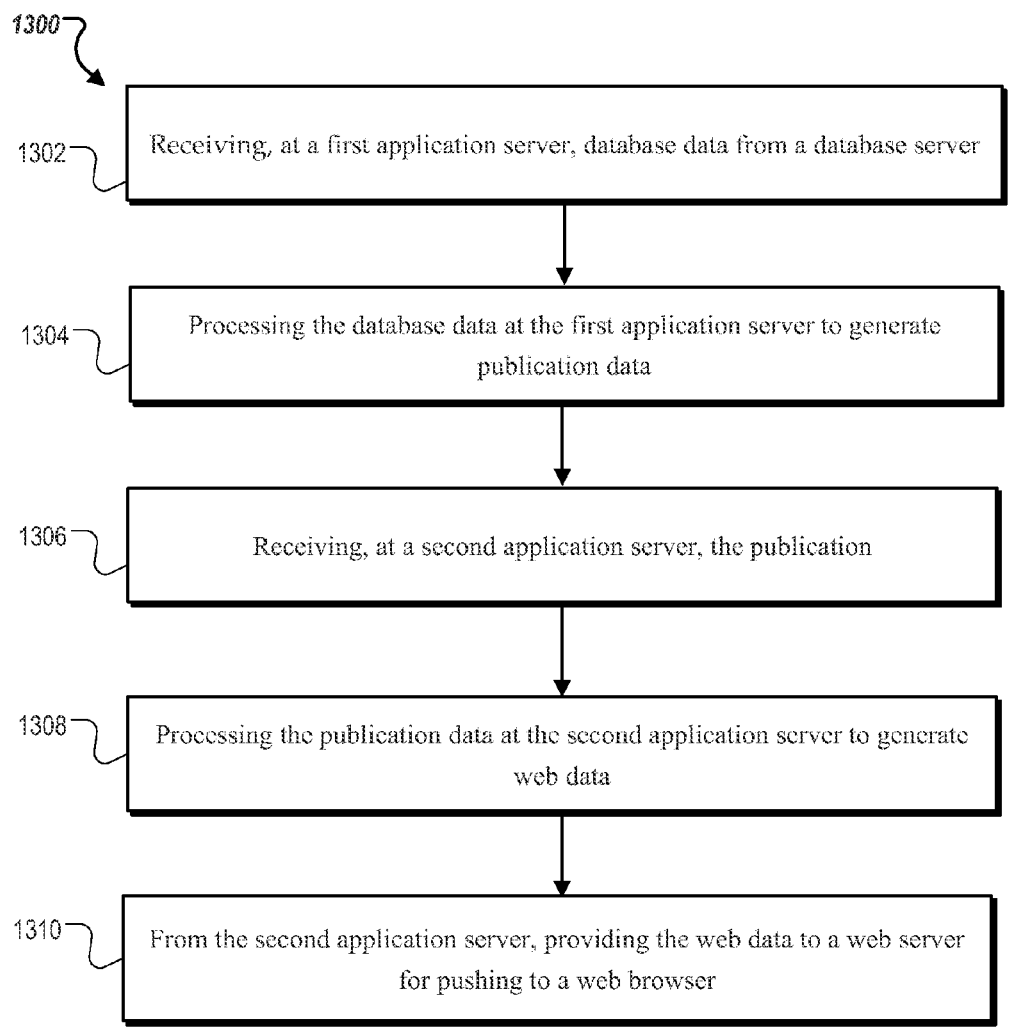
FIG. 13 is a flowchart of an exemplary process 1300 executed on a system implementing a notification-based web application framework.

FIG. 13 is a flowchart of an exemplary process 1300 executed on a system implementing a notification-based web application framework. A first application server can receive (1302) database data from a database server (e.g., database server 248 as described above in reference to FIG. 2A). The first application server can include database-side application server 246 as described above in reference to FIG. 2A. The first application server can be optimized to communicate with the database server. For example, the first application server can be a wrapper around the database server and include interfaces based on an API specification for coupling to the database server. The database data can include at least one of content data, user interface configuration data, and logic data. The content data can include, for example, alphanumerical values, arrays, lists, indices, or multimedia data. The content data can be stored in one or more database tables. The user interface configuration data can include identifiers of user interface items and properties corresponding to each user interface item. The logic data can include triggers, scripts, procedures, and relationship definitions between the triggers, scripts, procedures, and the user interface items.

In some implementations, receiving (1302) the database data from the database can include retrieving, at the first application server, the database data from the database server. Retrieving the database data can occur upon receiving a database notification from the database server by the first application server. The database notification can indicate that the database data are created, changed, or deleted at the database server.

The first application server can process (1304) the received database data to generate publication data. The first application server can include a first web publishing engine based on a first language (e.g., C or C++). Processing the database data at the first application server to generate publication data can include optimizing the database notification to generate the publication data at the first application server. The publication data can include a publication notification that is a smart message configured to notify another server of a data change or a state change. Processing the database data at the first application server to generate publication data can include translating user interface data stored in a database into a document in plain text or in a text-based data interchange language. The text-based data interchange language can include at least one of a markup language (e.g., extensible markup language (XML) or YAML) or a Java-based scripting language (e.g., JavaScript Object Notation (JSON)).

A second application server can receive (1306) the publication data from the first application server. Receiving the publication data from the first application server can include receiving, at the second application server, a publication notification from the first application server. Upon receiving the publication notification, the second application server can retrieve, from the first application server, the publication data.

The second application server can include web-side application server 244 as described above in reference to FIG. 2A. The second application server can include a second web publishing engine based on a second language (e.g., Java) that is different from the first language. The second application server can be optimized to communicate with a web server. For example, in some implementations, at least a portion of the second application server can be implemented as an extension module of a web server.

The first application server can be programmed to communicate with the second application server using an inter-process communication component for communicating between a first process based on the first language and a second process based on the second language. The inter-process communication component can be a component configured to process notifications to facilitate asynchronous communications. For example, the inter-process communication component can include the asynchronous communication layer 252 as described above in reference to FIG. 2A.

The second application server can process (1308) the publication data to generate web data. Generating the web data can include generating a user interface item. The user interface item can include display specifications (e.g., type, size, or color). The user interface item can be associated with a user interface item identifier.

The second application server can provide (1310) the web data to a web server for pushing to a web browser. The web server can compose at least a portion a web page (e.g., in HTML) that includes the user interface item having the display specifications. The web server can then send the portion of the web page or the web page in the entirety to a web browser.

In some implementations, at least one of the first application server or the second application server is programmed to perform notification queuing for asynchronous communication between the database server and the web browser. The notification queuing can be based on a timestamp of each notification, a priority of each notification, or both.

Figure 14A:
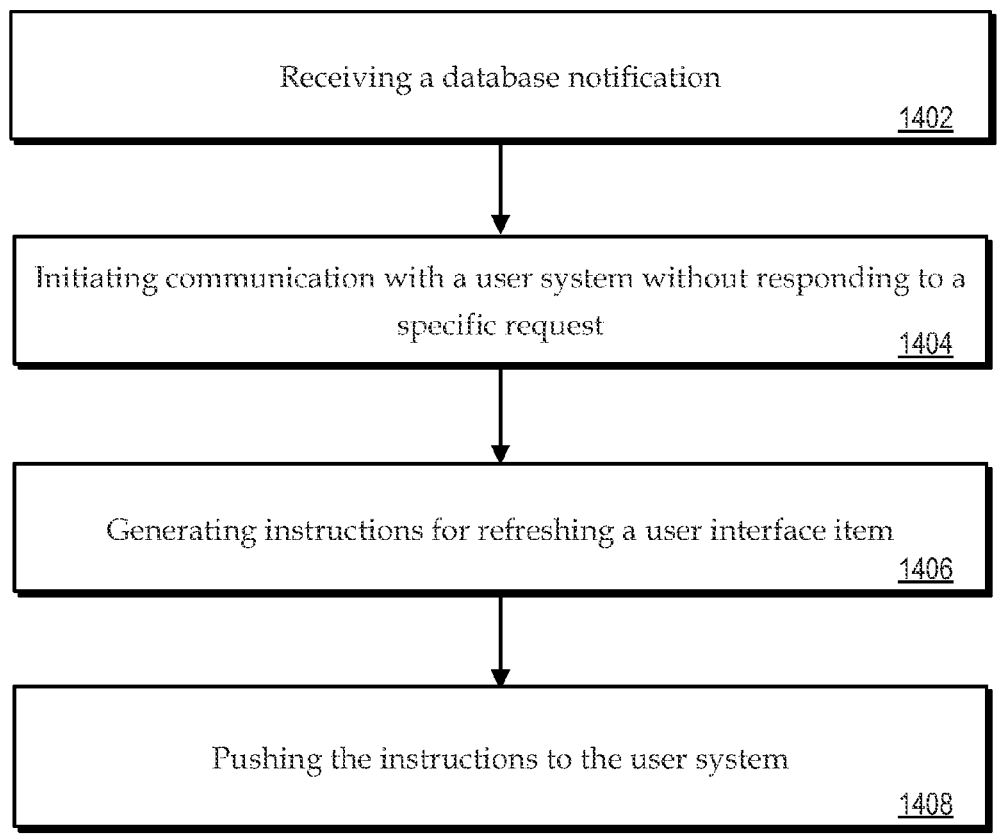
FIGS. 14A and 14B are flowcharts of exemplary processes of pushing database changes from a server to a user device.

FIG. 14A is a flowchart of exemplary process 1400 of pushing database changes from a server to a user device. A web application system can receive (1402) a database notification from a database server. The web application system can include, for example, database-side application server 246, as described above in reference to FIG. 2A. The web application system can be a web publishing system. The database notification can indicate that an update of a user interface item for a web application has occurred in the database. The database notification can be generated from the database server in response to a generic request from a user device. The generic request can be a request to receive information when a state change occurs at the database server. The generic need not specify what type of state change can cause the notification to be sent. The user device can include a browser and a computer on which the browser executes. The computer can include a desktop computer, a smart phone, or a tablet device.

The database can store a configuration of the user interface item. The configuration can include at least one of a display configuration of the user interface item or a logical configuration of the user interface item. The update of the user interface item can include at least one of an update of the display configuration or an update of the logical configuration.

The display configuration can include a display specification of a characteristic, for example, a color, shape, size, pattern, label, or type, of the user interface item. The display specification can include an absolute or relative location at which the browser renders the user interface item. The logical configuration can include a logical specification of an identifier of the user interface item. The logical specification of an identifier of the user interface item can include an operation (e.g., an arithmetic operation, a logic operation, or a sorting operation) associated with the identifier. The logical configuration can include a reference to a procedure to be invoked when a user input is received through the user interface item. Additionally or alternatively, the logical configuration can include a relationship between the user interface item and a data item.

The web application system can initiate (1404) communication with the user device. The communication need not be initiated in response to a specific user request from the user device. The specific user request can be a request for notification on a specific database update, e.g., a specified type of state change. Initiating communication with the user device can include sending a notification at a head of a notification queue managed by the web application system to an intermediate web application system. The intermediate web application system can include the web-side application server 244 as described above in reference to FIG. 2. The notification can be configured to cause the intermediate web application system to open a communication channel to the user device through a web server (e.g., web server 242 as described in reference to FIG. 2A), regardless of whether an existing communication channel is present.

The web application system can generate (1406) instructions for refreshing the user interface item in the browser. The instructions can include instructions to bind the user interface item with the identifier of the user interface item and the reference to the procedure to be invoked. The instructions can include instructions operable to cause the browser to switch between states, for example, from a paused stated to a resumed state or from a resumed state to a paused state. The instructions can include instructions operable to disable the user interface item when the browser is in the paused state, and instructions operable to enable the user interface item when the browser is in the resumed state.

Generating the instructions for refreshing the user interface item in the browser can include generating a first instruction to instruct the browser to perform a first action of rendering the user interface item in a first state. Generating the instructions can include generating a second instruction to instruct the browser to perform a second action of rendering the user interface item in a second state. Generating the instructions can include determining a condition for sending the second instruction to the user device. Determining the condition for sending the second instruction to the user device can include determining the condition based on a logical configuration of the user interface item.

The web application system can push (1408) the instructions to the user device for refreshing the user interface item as displayed in the browser according to the update in the database. Further details on the operations of pushing the instructions to the user device are described below in reference to FIG. 14B.

Figure 14B:
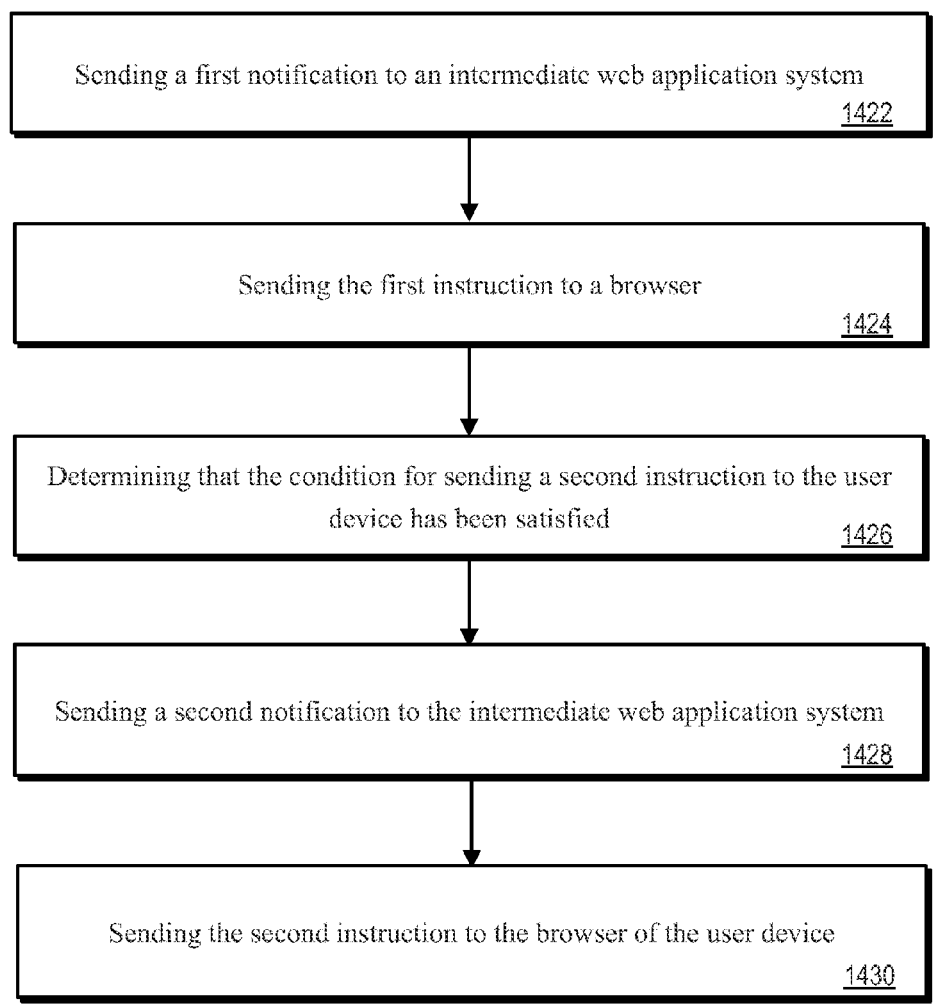

FIG. 14B is a flowchart of an exemplary process of pushing (1408) instruction to a user device from a web application system. The web application system can include database-side application server 246 as described above in reference to FIG. 2. The user device can be a computer on which client 228 (e.g., a browser) executes.

The web application system can send (1422) a first notification to an intermediate web application system for opening a first communication channel to the user device. The intermediate web application system can include the web-side application server 244 as described in reference to FIG. 2A.

The web application server can send (1424) the first instruction to the browser of the user device through the first communication channel. The web application server can determine (1426) whether a condition for sending the second instruction to the user device has been satisfied. When the condition is satisfied, the web application server can then send (1428) a second notification to the intermediate web application system for opening a second communication channel to the user device. The web application server can then send (1430) the second instruction to the browser of the user device through the second communication channel without receiving a request from the user device for the second instruction.

Figure 15A:
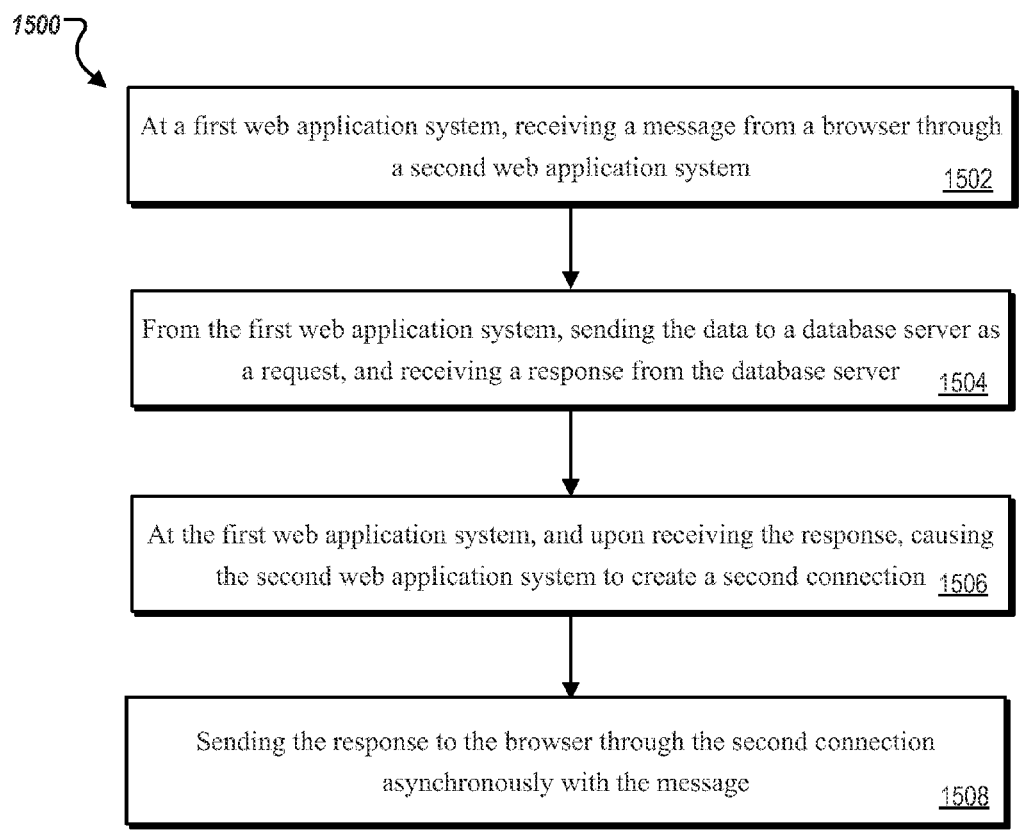
FIG. 15A is a flowchart of an exemplary process of unblocked request processing.

FIG. 15A is a flowchart of exemplary process 1500 of unblocked request processing. A first web application system can receive 1502 a message from a browser through a second web application system. The first web application system can be database-side application server 246 as described above in reference to FIG. 2A. The second web application system can be web-side application server 244 as described above in reference to FIG. 2A. The second web application system can be configured to communicate with the browser through a web server (e.g., web server 242 as described in reference to FIG. 2A). The message can include data and metadata. The metadata can indicate that the second web application system received the data from the browser of a user system using a first connection between the second web application system and the browser.

The metadata can include at least one of the following: a user context including user information and application information; an object identifier identifying a user interface item that caused the message to be sent from the browser to the second web application system; a field identifier identifying a data field in a database managed by the database server; a priority indicator indicating a priority of the message; or a message type indicating a protocol-specific type of the message. Upon receiving the message, the first web application system can terminate the first connection.

The first web application system can send (1504) the data to a database server as a request, and receive a response from the database server. The database server can be database server 248 as described above in reference to FIG. 2A. The first web application system can wait for the response from the database server when the database server processes the request from the first web application system. While waiting for the response, the first web application system causes the second web application system to unblock the browser. After the browser is unblocked, the first web application system can receive a second message from the unblocked browser through the second web application system while waiting for the response from the database server. The first web application system can create a job for processing the second message. The first web application system can enter the job into a request dispatcher that includes one or more jobs to be processed. The first web application system can send data in the second message to the database server as a second request upon receiving the response from the database server.

Upon receiving the response, the first web application system can cause (1506) the second web application system to create a second connection between the second web application system and the browser based on the metadata. In some implementations, process 1500 can include entering the response in an event priority queue before causing the second web application system to create a second connection between the second web application system and the browser based on the metadata.

The first web application system can send (1508) the response to the browser through the second connection asynchronously with the message. In some implementations, the data of the message can include a request for database content. The response from the database server can include a notification that the database content is ready for fetching. Sending the response to the browser through the second connection can include notifying the second web application system that the database content is ready.

In some implementations, the first web application system can manage a state of the browser through the second web application system. The first web application system can manage a state of the database server. The operations of managing a state of the browser are described in further detail below in reference to FIG. 15B.

Figure 15B:
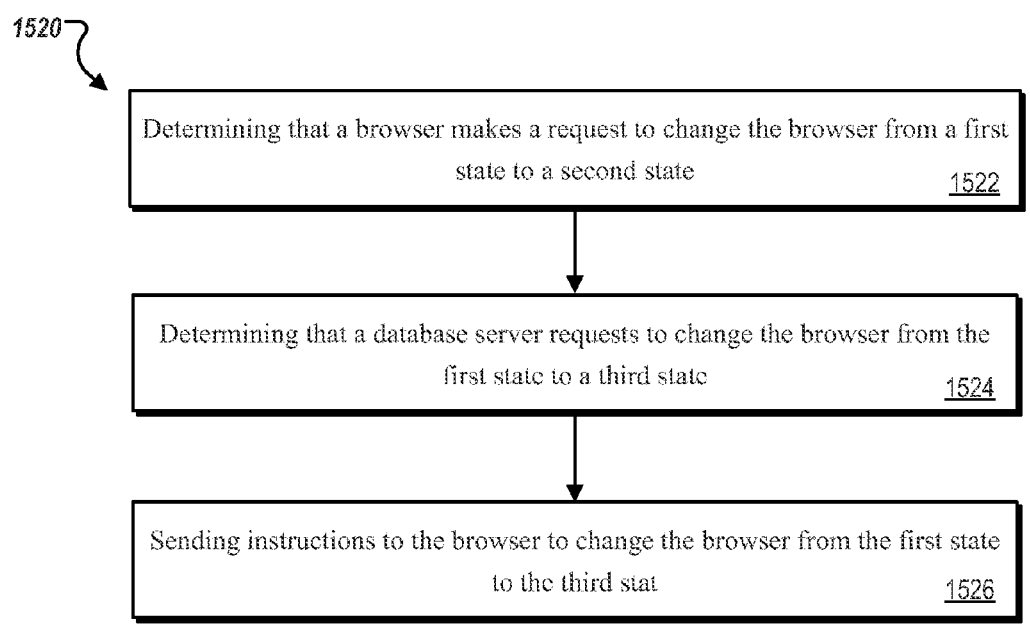
FIG. 15B is a flowchart of an exemplary process of managing states of a browser from a server.

FIG. 15B is a flowchart of exemplary process 1520 of managing states of a browser from a server. A first web application system can determine (1522), based on the message from a browser through a second web application system, that the browser makes a request to change the browser from a first state to a second state. The first web application system can be database-side application server 246 as described above in reference to FIG. 2A. The second web application system can be web-side application server 244 as described above in reference to FIG. 2A.

The first web application system can send the data to a database server as a request, and receive a response from the database server. The first web application system can determine (1524) that a response from the database server includes a request to change the browser from the first state to a third state before setting the browser to the second state.

The first web application system can send (1526) instructions to the browser through the second web application system. The instructions can be configured to change the browser from the first state to the third state. After the browser has changed to the third state, the browser can change from the third state to the second state. When the browser is in the third state, the browser can display an indicator that the browser is in the third state. In some implementations, the browser does not display an indicator, and the third state is a state invisible to a user.

Exemplary System Architecture

Figure 16:
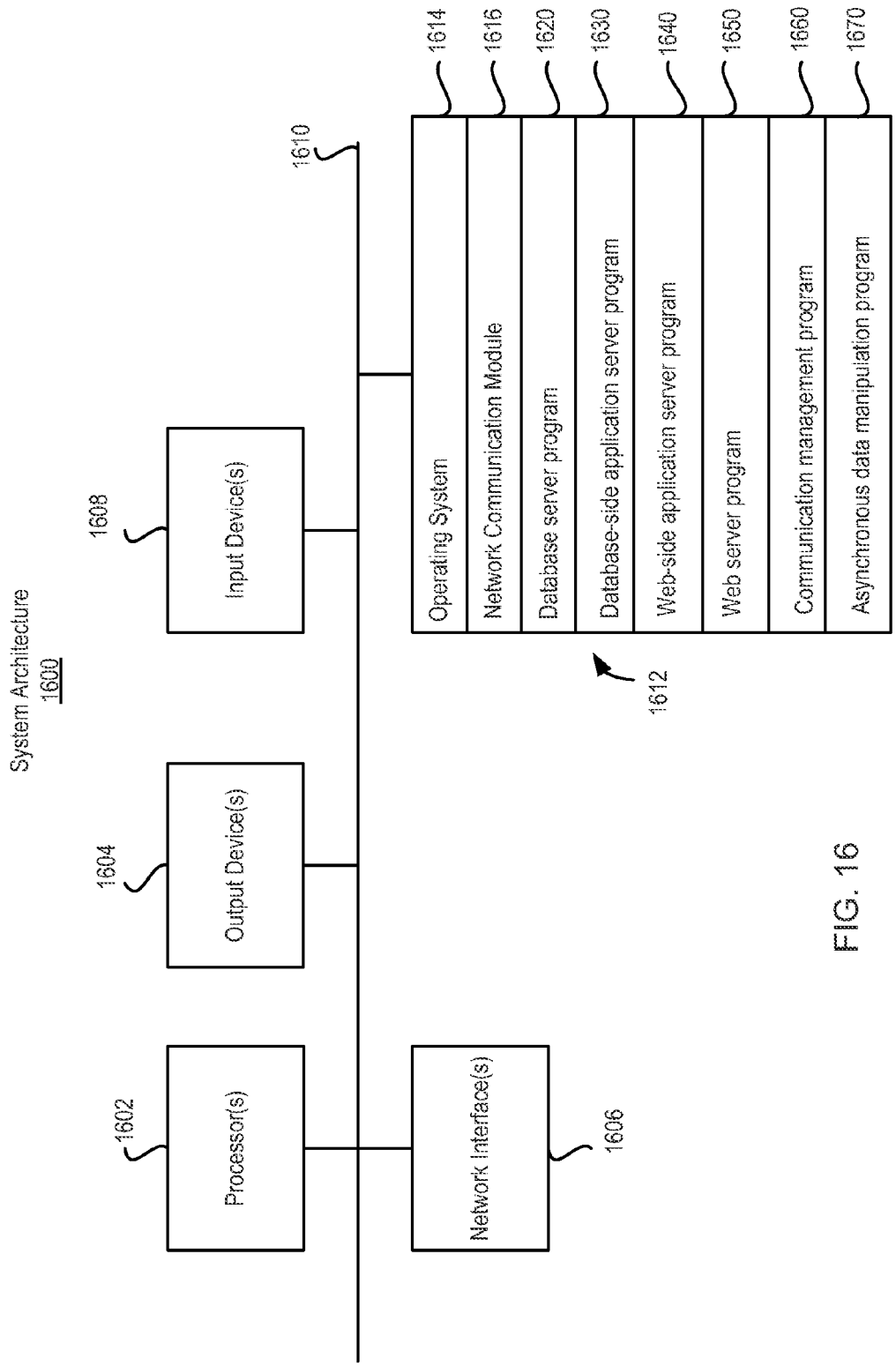
FIG. 16 is a block diagram of an exemplary system architecture for implementing the features and operations of FIGS. 1-15 and 17-18.

FIG. 16 is a block diagram of an exemplary system architecture 1600 for implementing the features and operations of FIGS. 1-15 and 17-18. Other architectures are possible, including architectures with more or fewer components. In some implementations, architecture 1600 includes one or more processors 1602 (e.g., dual-core Intel® Xeon® Processors), one or more output devices 1604 (e.g., LCD), one or more network interfaces 1606, one or more input devices 1608 (e.g., mouse, keyboard, touch-sensitive display) and one or more computer-readable mediums 1612 (e.g., RAM, ROM, SDRAM, hard disk, optical disk, flash memory, etc.). These components can exchange communications and data over one or more communication channels 1610 (e.g., buses), which can utilize various hardware and software for facilitating the transfer of data and control signals between components.

The term "computer-readable medium" refers to any medium that participates in providing instructions to processor 1602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1612 can further include operating system 1614 (e.g., Mac OS® server, Windows® NT server), network communication module 1616, database server program 1620, database-side application server program 1630, web-side application server program 1640, web server program 1650, communication management program 1660, and asynchronous data manipulation program 1670. Operating system 1614 can be multi-user, multiprocessing, multitasking, multithreading, real time, etc. Operating system 1614 performs basic tasks, including but not limited to: recognizing input from and providing output to devices 1606, 1608; keeping track and managing files and directories on computer-readable mediums 1612 (e.g., memory or a storage device); controlling peripheral devices; and managing traffic on the one or more communication channels 1610. Network communications module 1616 includes various components for establishing and maintaining network connections (e.g., software for implementing communication protocols, such as TCP/IP, HTTP, etc.).

Database server program 1620 can include computer instructions that, when executed, cause processor 1602 to perform operations of database server 248 as described above in reference to FIG. 2A. Database server program 1620 can include interfaces to one or more databases on a file system. The databases can be organized under a hierarchical folder structure, the folders mapping to directories in the file system. Database-side application server program 1630 can include computer instructions that, when executed, cause processor 1602 to perform operations of database-side application server 246 as described above in reference to FIG. 2A. Web-side application server program 1640 can include computer instructions that, when executed, cause processor 1602 to perform operations of web-side application server 244 as described above in reference to FIG. 2A. Web server program 1650 can include computer instructions that, when executed, cause processor 1602 to perform operations of web server 242 as described above in reference to FIG. 2A. Communication management program 1660 can include computer instructions that, when executed, facilitate synchronous and asynchronous communication between various components of the notification-based web application framework. Asynchronous data manipulation program 1670 can include computer instructions that, when executed, causes processor 1602 to perform operations described in reference to FIGS. 17 and 18.

Architecture 1600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Figure 17:
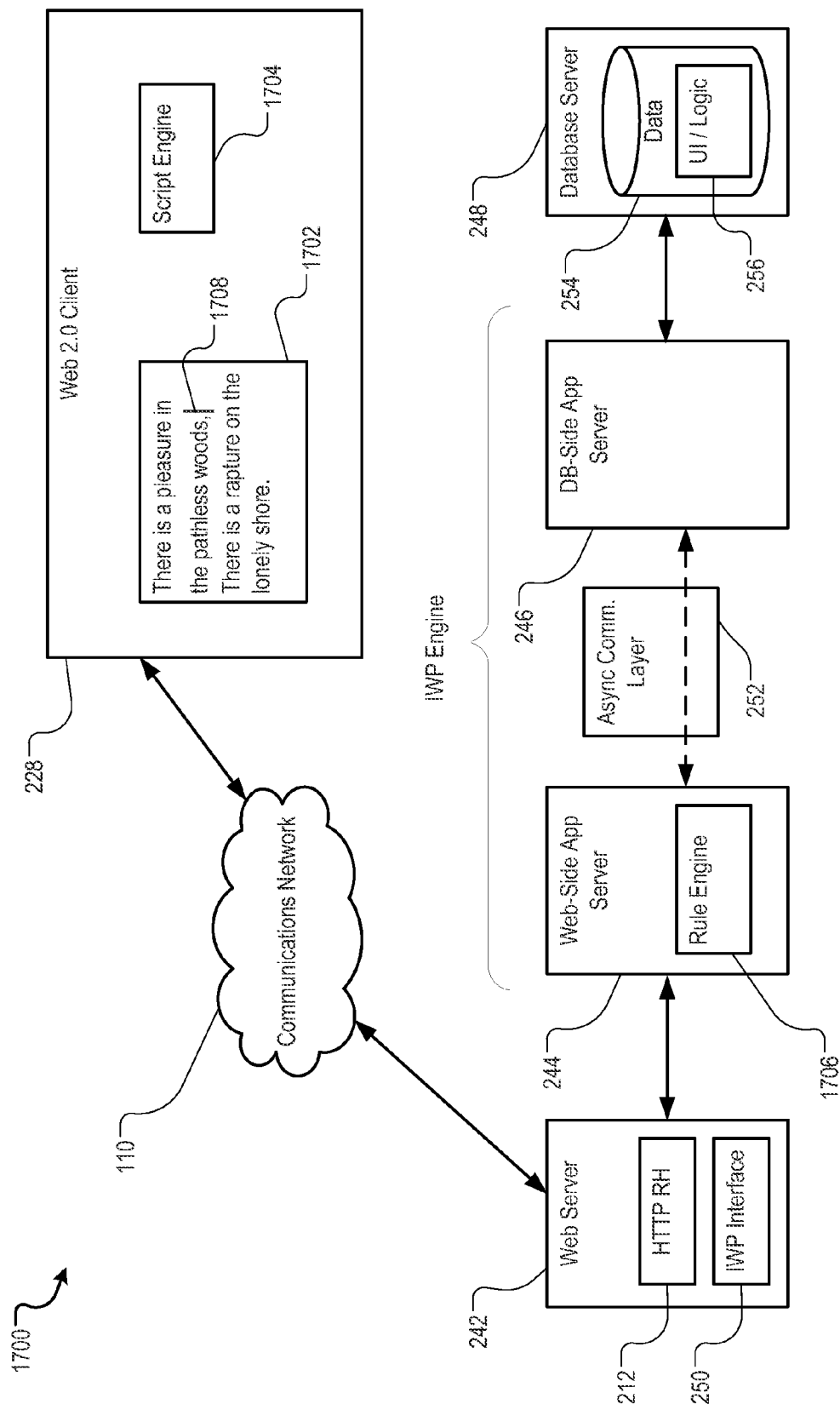
FIG. 17 is a block diagram of an exemplary system for asynchronous data manipulation.

FIG. 17 is a block diagram of an exemplary system 1700 for asynchronous data manipulation. Client 228 can leverages the power of the server to provide a more responsive user experience. Client 228 can use a hybrid approach to handling user interactions. When client 228 receives an action, depending on certain states and attributes, client 228 can directly process the action or send the action to web server 242, the IWP engine, and database server 248 to be processed. Processing an action directly in client 228 can reduce response time between the action and any consequential results. Accordingly, compared to processing the action in the server, the response time is not subjected to network latency and bandwidth, server load, and data transfer delays among the different processes.

Client 228 can implement this hybrid approach for text field focusing. Client 228 can allow focus into a text field by clicking or tabbing without having the user wait for response from the server if the text field does not have script triggers, data formatting, and is not in a portal object or list view. With script triggers, the state of the application can change the moment a user clicks in, or when the user types anything or performed any other action during this time. The user action may become meaningless if the state had changed. With data formatting, the text in the text field can be in a formatted form when not focused and in raw format when focused. When the field is focused, client 228 may need to get the raw data from the server since client 228 may prohibit the user from editing off the formatted text.

Additionally, tab order may not be intuitive or trivial, especially when a data field in a portal is focused or the user is in list view. A portal can be a layout object in a table where a user places one or more related fields to display in rows of data from one or more related records. A list view displays records one record at a time in a list format. In the cases that involve script triggers, formatting information, portal, and list view, client 228 relies on the logic in the server to determine what the next steps are.

Client 228 can allow optimistic processing. In various cases, client 228 can assume that certain actions can take place without waiting for server response. This allows the user to continue on without perceived delay. For example, client 228 may optimistically assume that, for a pre-specified threshold percentage of times (e.g., 80 percent), certain actions do not affect state of the application. In the 20 percent of the times when the action does fail, client 228 can receive an error from the server at a later time and be able to correct the application by putting the user back to the correct state. An example of optimistic processing is record locking. In a text data field 1702 of a data record, a user may type text. Upon receiving the first character typed, client 228 notifies the server of the modification while the user is allowed to continue typing. When the server receives this modification, the server checks to see whether the data record is already in use. If not, the server locks the record and allows the user to edit. The user could have already been editing and no harm is done. However, if the record is already in use by another user on another client, the server will return an error in which case client 228 can show an error dialog to the user and all changes will be reverted. Although the user "loses" all that has been typed, the user was not supposed to be editing anyways. Compared to a conventional client, by optimizing for the more common user case, client 228 provides a better, more responsive experience for users.

In our approach, the server, including web server 242, web-side application server 244, database-side application server 246, and database server 248 working together, is aware of all actions that are occurring in client 228. The server maintains client state because in various scenarios, the server uses a correct state to process the actions. Depending on the frequency and type of actions in client 228 and performance and traffic at the server, client 228 and server will be out of synchronization at times. If the action is directly processed in client 228, state in client 228 may be ahead of the state at the server. The server will receive, from client 228, notifications of the actions performed by client 228 and catch up at some point. If client 228 sends the action to server for processing, upon processing, the server state may be ahead of that of client 228. Client 228 can wait for a server response. When client 228 receives the updates, client 228 can then catch up to the server. If the client state is more up-to-date than state on the server, client 228 can ignore any state changes being sent from the server. However, if client 228 is waiting for server changes, client 228 may not ignore these updates. When performing actions, client 228 informs the server on whether or not client 228 is to ignore the results. The server tracks this information. When changes occur, the server may know whether client 228 should be ignoring the changes.

The features of FIG. 17 can be applied to text field focusing as well as other data fields. In some implementations, client 228 use logic encoded in script engine 1704 to handle which field to focus into when client 228 receives input using a tab key for navigation. In some implementations, client 228 use logic encoded in script engine 1704 to handle validation and data formatting. Client 228 can process validations including, for example, number of characters, number type, and date type, without having to go all the way to the server before the changes are allowed or rejected. With data formatting, script engine 1704 can include logic on the client side to receive raw text and apply formatting rules when the user focuses in and out of a data field.

Script engine 1704 can include programs of a scripting language, e.g., JavaScript™, that perform various functions. Script engine 1704 can retrieve conditions from a server, e.g., web-side application server 244, conditions associate with a data field displayed in a browser. The data field can display a data item, e.g., a text string as shown in text data field 1702. The data item can be stored in database 254. Retrieving the conditions can be triggered by various events, e.g., events of a layout update on client 228 or in database 254.

Rule engine 1706 of web-side application server 244 can provide the conditions in response. The conditions can specify whether a state of the data item may change when a user performs an action on the data item on client 228. The state may be one of the states described in reference to FIG. 11. The action can be focusing or editing the data item. The conditions can specify whether client 228 shall synchronize the data item with database 254 before allowing a user to perform the action.

Client 228 can receive a user action for focusing on the data item or for editing the data item. For example, a user action may be placing curser 1706 in text displayed in text data field 1702. In response, script engine 1704 can inspect conditions associated with text data field 1702 to determine whether to allow the user to focus on the text before updating state of the text from the database. If yes, script engine 1704 can allow the user to place curser 1708 in the text while asynchronously updating the state without forcing the user to wait. If no, script engine 1704 can update the state synchronously, e.g., by allowing the user to place curser 1708 in the text only after the text, and state of the text, are synchronized with the database.

In optimistic implementations, script engine 1704 may allow a user to perform certain actions on a data item even if state of the data item may change. Script engine 1704 can determine a probability that the state will change based on various criteria, e.g., historically, how often the state changes during the user action. For example, the user action may be editing text displayed in text data field 1702. Script engine 1704 can determine, according to information provided by rule engine 1706, that historically, in X percent of occasions, the text remains unchanged in database 254 while a user edits the text. Script engine 1704 can determine that the X percentage satisfies an optimism threshold. In response, script engine 1704 can allow the user to start editing while performing synchronization between the displayed text and the stored text.

The state of a data item, e.g., of text displayed in text data field 1702, may change on the server after the user already entered editing. Script engine 1704 may receive, from web-side application server 244, information upon completion of the synchronization indicating that state of the text, or the text, has changed. For example, script engine 1704 may receive information indicating that the text stored in database 254 is locked by another client, or the text stored in database 254 has changed. In response, script engine 1704 can modify the text displayed in text data field 1702 to remove editing performed by the user.

Figure 18:
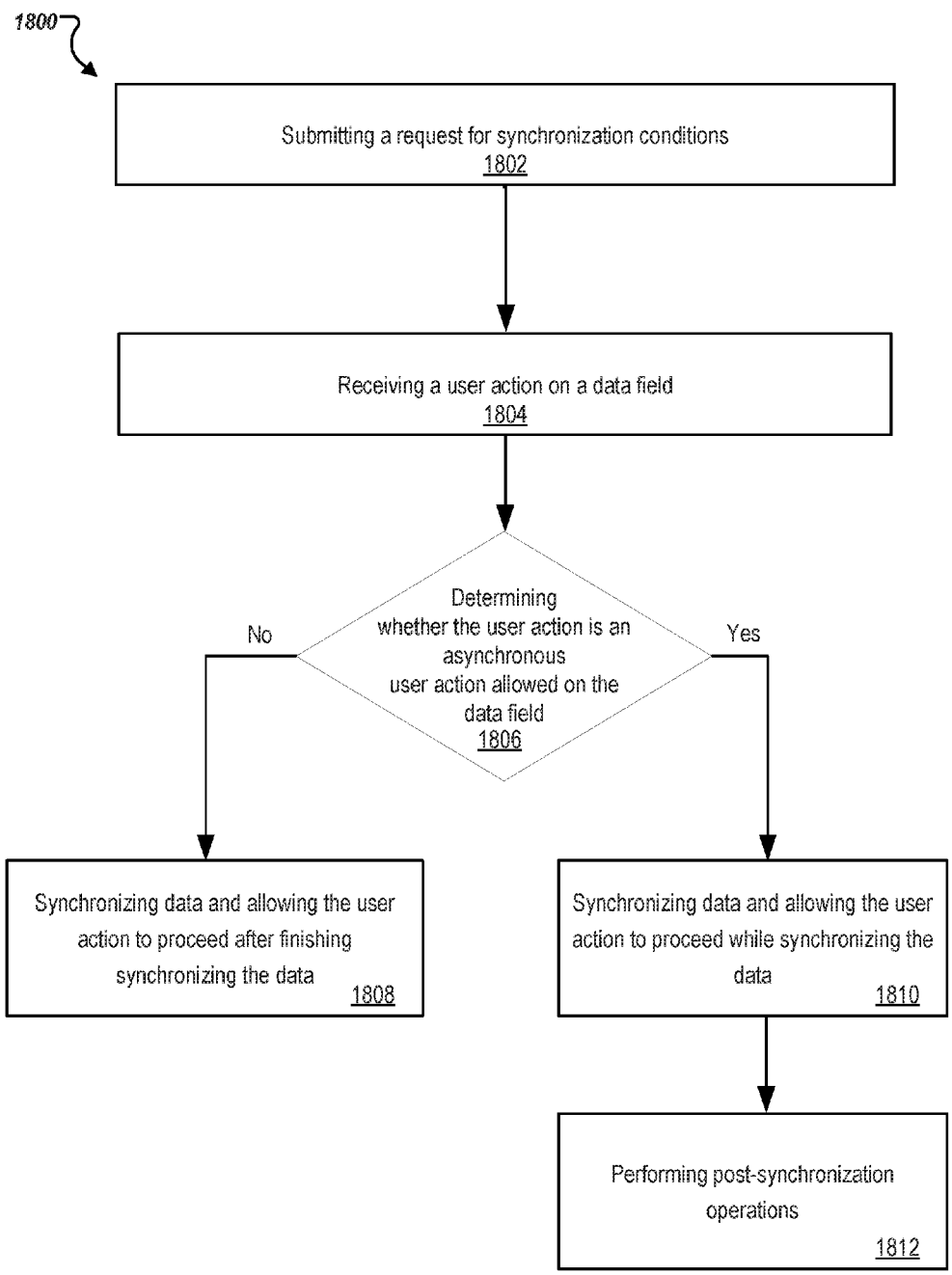
FIG. 18 is a flowchart of an exemplary process of asynchronous data manipulation.

FIG. 18 is a flowchart of an exemplary process 1800 of asynchronous data manipulation. Process 1800 can be performed by a client device, e.g., a smart phone, a wearable electronic device, or a desktop, laptop, or tablet computer.

The client device can submit (1802) to an IWP engine that includes web-side application server 244 (of FIG. 17) and database-side application server 246 (of FIG. 17), a request for synchronization conditions. The synchronization conditions are to be associated with a data field, e.g., text data field 1702 of FIG. 17, displayed in a web browser of the client device. The conditions can indicate whether asynchronous user actions are allowed on the data field. The asynchronous user actions can be actions performed on data displayed in the data field before synchronizing the data with data stored in a database hosted on a database server backend of the instant web-publishing engine is completed.

The synchronization conditions can specify that the asynchronous user actions are allowed if a state of the data stored on a database server will not change during the user action or that a probability that a state of the data stored on a database server will change during the user action is below a pre-specified threshold.

In some implementations, the synchronization conditions can specify that the state of the data stored on a database server will not change if the data field is a text field and if the text field lacks a script trigger and lacks data formatting information. In some implementations, the synchronization conditions can specify that the state of the data stored on a database server will not change if that the data is not a portal object and if the data field is not displayed in a list view. In some implementations, the synchronization conditions can specify that the state of the data stored on a database server will not change if the client device is the only client device connected to the database.

The asynchronous user actions can include at least one of editing the data or focusing on the data field. Focusing on the data field can include tabbing to the data field, clicking on the data field, or touching the data field. The client device can receive (1804) a user action on the data field.

The client device can determine (1806) whether the user action is one of the asynchronous user actions allowed on the data field as specified in the synchronization conditions received from the instant web-publishing engine in response to the request.

Upon determining that the user action is not one of the asynchronous user actions allowed on the data field, the client device can perform actions 1808, including synchronizing the data and allowing the user action to proceed after finishing synchronizing the data.

Upon determining that the user action is one of the asynchronous user actions allowed on the data field, the client device can perform actions 1810, including synchronizing the data and allowing the user action to proceed while synchronizing the data.

In some implementations, after allowing the user action to proceed while synchronizing the data, the client device can perform post-synchronization operations 1812. Post- synchronization operations 1812. can include receiving a result of the synchronizing that conflicts with the user action. In response, the client device can override the user action using the result of the synchronizing. For example, the user action can include editing the data. The result can include an indicator that the data is locked by another client device during the editing. In response, the client device can override the user action by reverting the editing.

Exemplary Mobile Device Architecture

Figure 19:
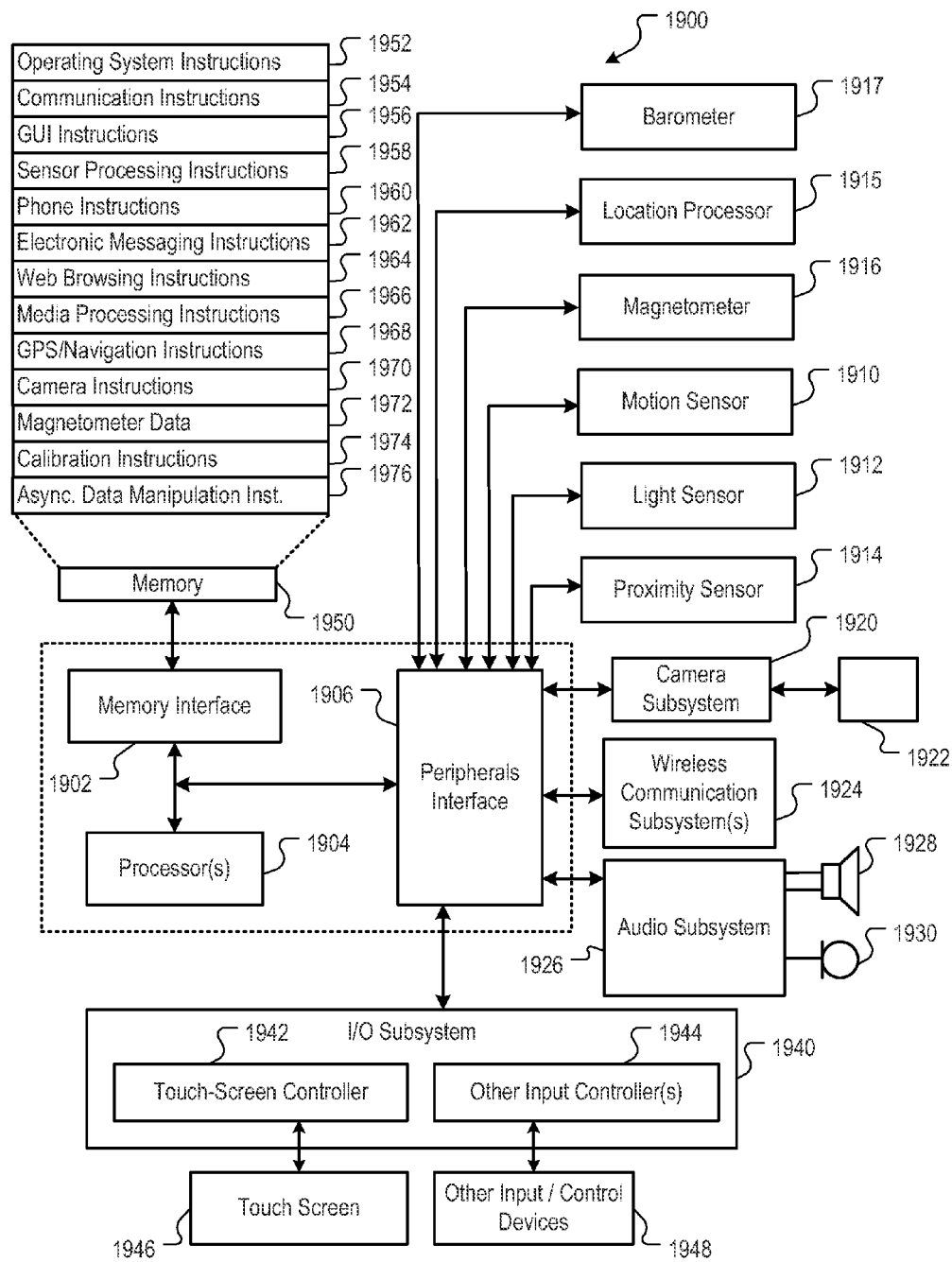
FIG. 19 is a block diagram illustrating an exemplary device architecture of a mobile device implementing the features and operations described in reference to FIGS. 1-15 and 17-18.

FIG. 19 is a block diagram of an exemplary architecture 1900 for the mobile devices of FIGS. 1-15 and FIG. 17-18. A mobile device (e.g., a client device as described in FIGS. 17 and 18) can include memory interface 1902, one or more data processors, image processors and/or processors 1904, and peripherals interface 1906. Memory interface 1902, one or more processors 1904 and/or peripherals interface 1906 can be separate components or can be integrated in one or more integrated circuits. Processors 1904 can include application processors, baseband processors, and wireless processors. The various components in the mobile device, for example, can be coupled by one or more communication buses or signal lines.

Sensors, devices, and subsystems can be coupled to peripherals interface 1906 to facilitate multiple functionalities. For example, motion sensor 1910, light sensor 1912, and proximity sensor 1914 can be coupled to peripherals interface 1906 to facilitate orientation, lighting, and proximity functions of the mobile device. Location processor 1915 (e.g., GPS receiver) can be connected to peripherals interface 1906 to provide geopositioning. Electronic magnetometer 1916 (e.g., an integrated circuit chip) can also be connected to peripherals interface 1906 to provide data that can be used to determine the direction of magnetic North. Thus, electronic magnetometer 1916 can be used as an electronic compass. Motion sensor 1910 can include one or more accelerometers configured to determine change of speed and direction of movement of the mobile device. Barometer 1917 can include one or more devices connected to peripherals interface 1906 and configured to measure pressure of atmosphere around the mobile device.

Camera subsystem 1920 and an optical sensor 1922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1924, which can include radio frequency receivers and transmitters and/or optical (e.g., infrared) receivers and transmitters. The specific design and implementation of the communication subsystem 1924 can depend on the communication network(s) over which a mobile device is intended to operate. For example, a mobile device can include communication subsystems 1924 designed to operate over a GSM network, a GPRS network, an EDGE network, a Wi-Fi™ or WiMax™ network, and a Bluetooth™ network. In particular, the wireless communication subsystems 1924 can include hosting protocols such that the mobile device can be configured as a base station for other wireless devices.

Audio subsystem 1926 can be coupled to a speaker 1928 and a microphone 1930 to facilitate voice-enabled functions, such as voice recognition, voice replication, digital recording, and telephony functions. Audio subsystem 1926 can be configured to receive voice commands from the user.

I/O subsystem 1940 can include touch screen controller 1942 and/or other input controller(s) 1944. Touch-screen controller 1942 can be coupled to a touch screen 1946 or pad. Touch screen 1946 and touch screen controller 1942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1946.

Other input controller(s) 1944 can be coupled to other input/control devices 1948, such as one or more buttons, rocker switches, thumb-wheel, infrared port, USB port, and/or a pointer device such as a stylus. The one or more buttons (not shown) can include an up/down button for volume control of speaker 1928 and/or microphone 1930.

In one implementation, a pressing of the button for a first duration may disengage a lock of the touch screen 1946; and a pressing of the button for a second duration that is longer than the first duration may turn power to the mobile device on or off. The user may be able to customize a functionality of one or more of the buttons. The touch screen 1946 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 1902 can be coupled to memory 1950. Memory 1950 can include high-speed random access memory and/or non-volatile memory, such as one or more magnetic disk storage devices, one or more optical storage devices, and/or flash memory (e.g., NAND, NOR). Memory 1950 can store operating system 1952, such as Darwin, RTXC, LINUX, UNIX, OS X, iOS, WINDOWS, or an embedded operating system such as VxWorks. Operating system 1952 may include instructions for handling basic system services and for performing hardware dependent tasks. In some implementations, operating system 1952 can include a kernel (e.g., UNIX kernel).

Memory 1950 may also store communication instructions 1954 to facilitate communicating with one or more additional devices, one or more computers and/or one or more servers. Memory 1950 may include graphical user interface instructions 1956 to facilitate graphic user interface processing; sensor processing instructions 1958 to facilitate sensor-related processing and functions; phone instructions 1960 to facilitate phone-related processes and functions; electronic messaging instructions 1962 to facilitate electronic-messaging related processes and functions; web browsing instructions 1964 to facilitate web browsing-related processes and functions; media processing instructions 1966 to facilitate media processing-related processes and functions; GPS/Navigation instructions 1968 to facilitate GPS and navigation-related processes and instructions; camera instructions 1970 to facilitate camera-related processes and functions; magnetometer data 1972 and calibration instructions 1974 to facilitate magnetometer calibration. The memory 1950 may also store other software instructions (not shown), such as security instructions, web video instructions to facilitate web video-related processes and functions, and/or web shopping instructions to facilitate web shopping-related processes and functions. In some implementations, the media processing instructions 1966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1950. Memory 1950 can store asynchronous data manipulation instructions 1976 that, when executed by processor(s) 1904, cause processor(s) 1904 to perform operations as described in reference to FIGS. 17 and 18.

Each of the above identified instructions and applications can correspond to a set of instructions for performing one or more functions described above. These instructions need not be implemented as separate software programs, procedures, or modules. Memory 1950 can include additional instructions or fewer instructions. Furthermore, various functions of the mobile device may be implemented in hardware and/or in software, including in one or more signal processing and/or application specific integrated circuits.

Exemplary Operating Environment

Figure 20:
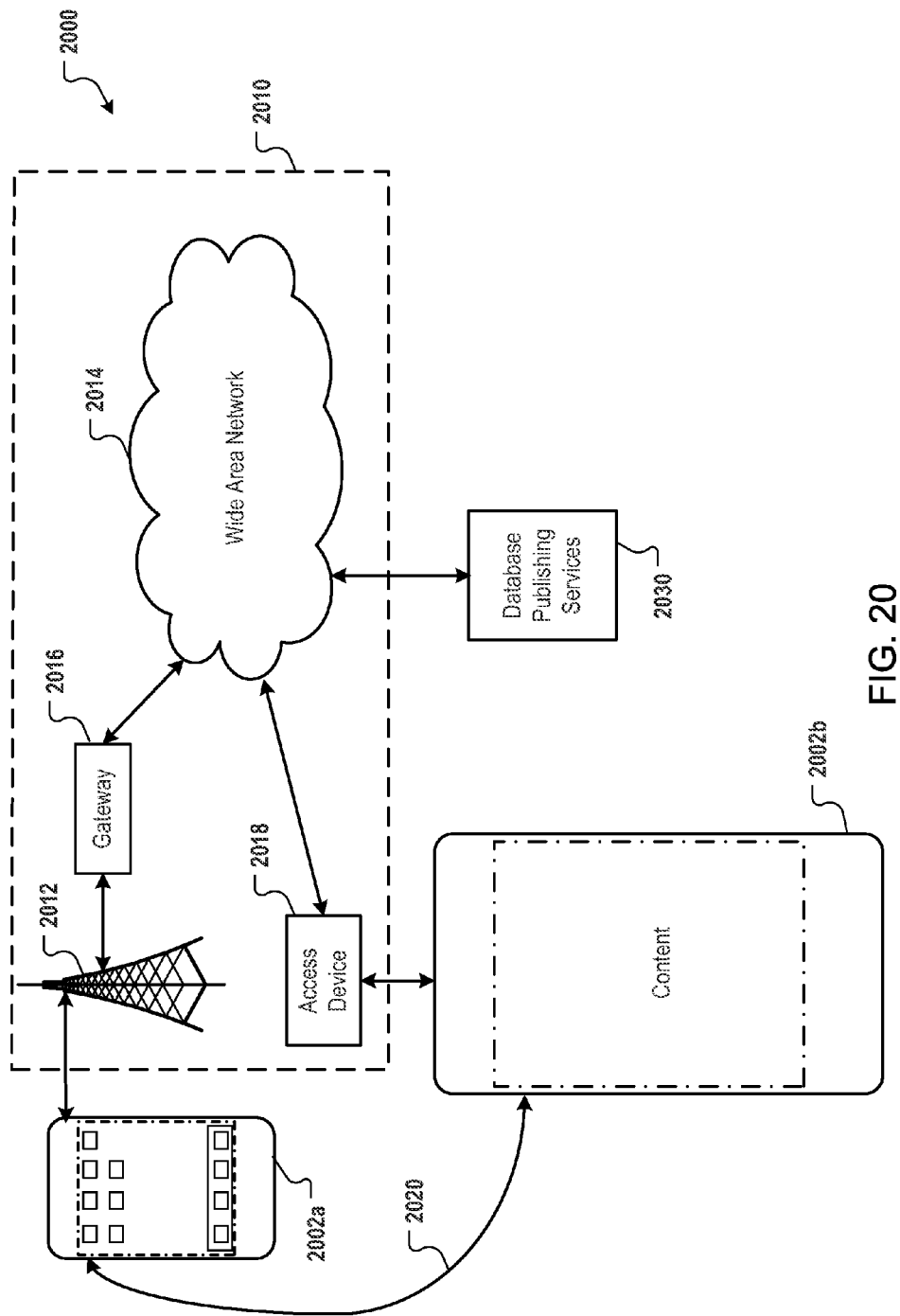
FIG. 20 is a block diagram of an exemplary network operating environment for the mobile devices of FIGS. 1-15 and 17-18.

FIG. 20 is a block diagram of an exemplary network operating environment 2000 for the mobile devices of FIGS. 1-15. Mobile devices 2002a and 2002b can, for example, communicate over one or more wired and/or wireless networks 2010 in data communication. For example, a wireless network 2012, e.g., a cellular network, can communicate with a wide area network (WAN) 2014, such as the Internet, by use of a gateway 2016. Likewise, an access device 2018, such as an 802.11g wireless access point, can provide communication access to the wide area network 2014.

In some implementations, both voice and data communications can be established over wireless network 2012 and the access device 2018. For example, mobile device 2002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 2012, gateway 2016, and wide area network 2014 (e.g., using Transmission Control Protocol/Internet Protocol (TCP/IP) or User Datagram Protocol (UDP)). Likewise, in some implementations, the mobile device 2002b can place and receive phone calls, send and receive e-mail messages, and retrieve electronic documents over the access device 2018 and the wide area network 2014. In some implementations, mobile device 2002a or 2002b can be physically connected to the access device 2018 using one or more cables and the access device 2018 can be a personal computer. In this configuration, mobile device 2002a or 2002b can be referred to as a "tethered" device.

Mobile devices 2002a and 2002b can also establish communications by other means. For example, wireless mobile device 2002a can communicate with other wireless devices, e.g., other mobile devices, cell phones, etc., over the wireless network 2012. Likewise, mobile devices 2002a and 2002b can establish peer-to-peer communications 2020, e.g., a personal area network, by use of one or more communication subsystems, such as the Bluetooth™ communication devices. Other communication protocols and topologies can also be implemented.

The mobile device 2002a or 2002b can, for example, communicate with one or more services 2030 over the one or more wired and/or wireless networks. For example, one or more database publishing services 2030 can provide services as described in reference to FIG. 17.

Mobile device 2002a or 2002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 2002a or 2002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For instance, although most examples are described in reference to web publishing, the techniques described can be applied to any database-backed web applications.

What is claimed is:

1. A method performed at a computing device comprising one or more processors, the method comprising:
submitting a request for synchronization conditions to an instant web publishing engine comprising a web-side application server and a database-side application server, the synchronization conditions associated with a data field displayed in a web browser of the computing device, wherein the data field comprises browser data;
receiving, from the instant web publishing engine, synchronization conditions indicating whether asynchronous user actions are allowed on the data field, wherein the asynchronous user actions comprise (i) user actions performed on browser data displayed in the data field before synchronizing the browser data with stored data in a database hosted on a database server backend of the instant web publishing engine is completed and (ii) user actions that will not change a state of the stored data in the database server backend during the user actions or a probability that the state of the stored data on the database server backend will change during the user actions is below a predefined threshold;
receiving a user action to be performed on the data field;
determining whether the user action comprises an asynchronous user action;
in response to a determination that the user action does not comprise an asynchronous user action:
synchronizing the browser data with the stored data prior to allowing the user action to proceed; and
in response to a determination that the user action comprises an asynchronous user action:
synchronizing the browser data with the stored data and allowing the user action to proceed while synchronizing the browser data with the stored data.

2. The method of claim 1, wherein the asynchronous user actions include at least one of editing the browser data or focusing on the data field, wherein focusing on the data field comprises tabbing to the data field, clicking on the data field, or touching the data field.

3. The method of claim 2, wherein the synchronization conditions specify that the asynchronous user actions are allowed if the state of the stored data on the database server backend will not change during the user action or that the probability that the state of the stored data on the database server backend will change during the user action is below a pre-specified threshold.

4. The method of claim 3, wherein the synchronization conditions specify that the state of the stored data on the database server backend will not change if the data field is a text field and if the text field lacks a script trigger and lacks data formatting information.

5. The method of claim 3, wherein the synchronization conditions specify that the state of the stored data on the database server backend will not change if the browser data is not a portal object and if the data field is not displayed in a list view.

6. The method of claim 3, wherein the synchronization conditions specify that the state of the stored data on the database server backend will not change if the computing device is the only computing device connected to the database.

7. The method of claim 1, comprising, after allowing the user action to proceed while synchronizing the browser data with the stored data:
receiving, from the database server backend, a result of the synchronizing that conflicts with the user action; and
in response to the result of the synchronizing, overriding the user action.

8. The method of claim 7, wherein:
the user action includes editing the browser data;
the result of the synchronizing includes an indicator that the stored data is locked by another computing device during the editing; and
overriding the user action comprises reverting the editing.

9. A non-transitory computer-readable storage medium programmed to include instructions that, when executed by one or more processors, cause the one or more processors to perform operations comprising:
submitting, by a client device comprising the one or more processors, a request for synchronization conditions to an instant web publishing engine comprising a web-side application server and a database-side application server, the synchronization conditions associated with a data field displayed in a web browser of the client device, wherein the data field comprises browser data;
receiving, from instant web publishing engine, synchronization conditions indicating whether asynchronous user actions are allowed on the data field, wherein the asynchronous user actions comprise (i) user actions performed on browser data displayed in the data field before synchronizing the browser data with stored data in a database hosted on a database server backend of the instant web publishing engine is completed and (ii) user actions that will not change a state of the stored data in the database server backend during the user actions or a probability that the state of the stored data on the database server backend will change during the user actions is below a predefined threshold;
receiving, by the client device, a user action to be performed on the data field;
determining whether the user action comprises an asynchronous user action;

in response to a determination that the user action does not comprise the asynchronous user action:
   synchronizing the browser data with the stored data and allowing the user action to proceed after finishing synchronizing the browser data with the stored data; and
in response to a determination that the user action comprises the asynchronous user action:
   synchronizing the browser data with the stored data and allowing the user action to proceed while synchronizing the browser data with the stored data.

10. The non-transitory computer-readable storage medium of claim 9, wherein the asynchronous user actions include at least one of editing data displayed on the data field or focusing on the data field, wherein focusing on the data field comprises tabbing to the data field, clicking on the data field, or touching the data field.

11. The non-transitory computer-readable storage medium of claim 10, wherein the synchronization conditions specify that the asynchronous user actions are allowed if a state of the stored data on the database server backend will not change during the user action or that the probability that the state of the stored data on the database server backend will change during the user action is below a pre-specified threshold.

12. The non-transitory computer-readable storage medium of claim 11, wherein the synchronization conditions specify that the state of the stored data on the database server backend will not change if the data field is a text field and if the text field lacks a script trigger and lacks data formatting information.

13. The non-transitory computer-readable storage medium of claim 11, wherein the synchronization conditions specify that the state of the stored data on the database server backend will not change if that the browser data is not a portal object and if the data field is not displayed in a list view.

14. The non-transitory computer-readable storage medium of claim 11, wherein the synchronization conditions specify that the state of the stored data on the database server backend will not change if the client device is the only client device connected to the database.

15. The non-transitory computer-readable storage medium of claim 9, the operations further comprising, after allowing the user action to proceed while synchronizing the browser data with the stored data:
   receiving, from the database server backend, a result of the synchronizing that conflicts with the user action; and
   in response to the result of the synchronizing, overriding the user action.

16. The non-transitory computer-readable storage medium of claim 15, wherein:
   the user action includes editing the browser data;
   the result of the synchronizing includes an indicator that the stored data is locked by another client device during the editing; and
   overriding the user action comprises reverting the editing.

17. A system comprising:
   one or more processors; and
   a non-transitory computer-readable storage medium storing instructions that, when executed by the one or more processors, cause the one or more processors to perform operations comprising:
     submitting, by a client device comprising the one or more processors, a request for synchronization conditions to an instant web publishing engine comprising a web-side application server and a database-side application server the synchronization conditions associated with a data field displayed in a web browser of the client device wherein the data field comprises browser data;
     receiving, from the instant web publishing engine, synchronization conditions indicating whether asynchronous user actions are allowed on the data field, wherein the asynchronous user actions comprise (i) user actions performed on browser data displayed in the data field before synchronizing the browser data with stored data in a database hosted on a database server backend of the instant web publishing engine is completed and (ii) user actions that will not change the state of the stored data in the database server backend during the user actions or a probability that the state of the stored data on the database server backend will change during the user actions is below a defined threshold;
     receiving, by the client device, a user action to be performed on the data field;
     determining whether the user action comprises an asynchronous user action;
     in response to a determination that the user action does not comprise the asynchronous user action:
       synchronizing the browser data with the stored data prior to allowing the user action to proceed; and
     in response to a determination that the user action comprises an asynchronous user action:
       synchronizing the browser data with the stored data and allowing the user action to proceed while synchronizing the browser data with the stored data.

18. The system of claim 17, wherein the asynchronous user actions include at least one of editing data displayed on the data field or focusing on the data field, wherein focusing on the data field comprises tabbing to the data field, clicking on the data field, or touching the data field.

19. The system of claim 18, wherein the synchronization conditions specify that the asynchronous user actions are allowed if the state of the stored data on the database server backend will not change during the user action or that the probability that the state of the stored data on the database server backend will change during the user action is below a pre-specified threshold.

20. The system of claim 19, wherein the synchronization conditions specify that the state of the stored data on the database server backend will not change if the data field is a text field and if the text field lacks a script trigger and lacks data formatting information.

21. The system of claim 19, wherein the synchronization conditions specify that the state of the stored data on the database server backend will not change if that the browser data is not a portal object and if the data field is not displayed in a list view.

22. The system of claim 19, wherein the synchronization conditions specify that the state of the stored data on the database server backend will not change if the client device is the only client device connected to the database.

23. The system of claim 17, the operations comprising, after allowing the user action to proceed while synchronizing the browser data with the stored data:
   receiving, from the database server backend, a result of the synchronizing that conflicts with the user action; and in response to the result of the synchronizing, overriding the user action.

24. The system of claim 23, wherein:
the user action includes editing the browser data;
the result of the synchronizing includes an indicator that the stored data is locked by another client device during the editing; and
overriding the user action comprises reverting the editing.

* * * * *